United States Patent
Ogawa et al.

(10) Patent No.: US 8,530,107 B2
(45) Date of Patent: Sep. 10, 2013

(54) SOLID OXIDE FUEL CELL MANIFOLD AND CORRESPONDING STACK

(75) Inventors: Tetsuya Ogawa, Wako (JP); Ayatoshi Yokokawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 485 days.

(21) Appl. No.: 12/863,891

(22) PCT Filed: Jan. 15, 2009

(86) PCT No.: PCT/JP2009/050908
§ 371 (c)(1),
(2), (4) Date: Jul. 21, 2010

(87) PCT Pub. No.: WO2009/093622
PCT Pub. Date: Jul. 30, 2009

(65) Prior Publication Data
US 2010/0297521 A1  Nov. 25, 2010

(30) Foreign Application Priority Data
Jan. 21, 2008  (JP) ................................ 2008-010021

(51) Int. Cl.
*H01M 8/24* (2006.01)
*H01M 8/04* (2006.01)
*H01M 8/10* (2006.01)

(52) U.S. Cl.
USPC ........................... 429/456; 429/495; 429/514

(58) Field of Classification Search
None
See application file for complete search history.

(56) References Cited

U.S. PATENT DOCUMENTS

| 5,773,160 | A * | 6/1998 | Wilkinson et al. ............ 429/434 |
| 8,062,807 | B2 | 11/2011 | Tsunoda |
| 8,247,128 | B2 | 8/2012 | Yamamura et al. |
| 2005/0123816 | A1* | 6/2005 | Gao et al. ....................... 429/30 |
| 2005/0136294 | A1* | 6/2005 | Tsunoda ......................... 429/12 |

(Continued)

FOREIGN PATENT DOCUMENTS

| JP | 2006-120589 | 5/2006 |
| JP | 2006-222099 | 8/2006 |
| JP | 2007-59147 | 3/2007 |
| JP | 2007-207500 | 8/2007 |

OTHER PUBLICATIONS

International Search Report for Application No. PCT/JP2009/050908, dated Jun. 5, 2009.

(Continued)

*Primary Examiner* — Ula C Ruddock
*Assistant Examiner* — Matthew Van Oudenaren
(74) *Attorney, Agent, or Firm* — Nelson Mullins Riley & Scarborough LLP; Anthony A. Laurentano

(57) ABSTRACT

A fuel cell and a fuel cell stack thereof includes separators, each of which includes a sandwiching section for sandwiching an electrolyte electrode assembly, a bridge and a reactant gas supply section, wherein the sandwiching section has a fuel gas channel and an oxygen-containing gas channel, the bridge has a fuel gas supply channel for supplying the fuel gas to the fuel gas channel and an oxygen-containing gas supply channel for supplying the oxygen-containing gas to the oxygen-containing gas channel, and a fuel gas supply passage for supplying the fuel gas to the fuel gas supply channel and an oxygen-containing gas supply passage for supplying the oxygen-containing gas to the oxygen-containing gas supply channel extend through the reactant gas supply section in the stacking direction.

22 Claims, 17 Drawing Sheets

(56) References Cited

U.S. PATENT DOCUMENTS

| | | | |
|---|---|---|---|
| 2006/0131008 A1* | 6/2006 | Ogawa | 165/158 |
| 2007/0065710 A1* | 3/2007 | Ogawa et al. | 429/38 |
| 2007/0111064 A1* | 5/2007 | Haile et al. | 429/26 |

OTHER PUBLICATIONS

Japanese Office Action for Application No. 2008-010021, 4 pages, dated Mar. 26, 2013.

* cited by examiner

⇨ OXYGEN-CONTAINING GAS
⇨ FUEL GAS
⇨ EXHAUST GAS

SOLID OXIDE FUEL CELL MANIFOLD AND CORRESPONDING STACK

RELATED APPLICATIONS

This application is a 35 U.S.C. 371 national stage filing of International Application No. PCT/JP2009/050908, filed Jan. 15, 2009, which claims priority to Japanese Patent Application No. 2008-010021 filed on Jan. 21, 2008 in Japan. The contents of the aforementioned applications are hereby incorporated by reference.

TECHNICAL FIELD

The present invention relates to a fuel cell formed by stacking an electrolyte electrode assembly between separators. The electrolyte electrode assembly includes an anode, a cathode, and an electrolyte interposed between the anode and the cathode. Further, the present invention relates to a fuel cell stack formed by stacking a plurality of the fuel cells.

BACKGROUND ART

A solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates). In use, generally, predetermined numbers of the electrolyte electrode assemblies and the separators are stacked together to form a fuel cell stack.

In the fuel cell, in order to supply a fuel gas such as a hydrogen-containing gas and an oxygen-containing gas such as the air to the anode and the cathode of the electrolyte electrode assembly, a fuel gas channel and an oxygen-containing gas channel are formed along surfaces of the separator.

For example, in a flat stack fuel cell disclosed in Japanese Laid-Open Patent Publication No. 2006-120589, as shown in FIG. 17, a separator 1 stacked on a power generation cell is provided. The separator 1 is formed by connecting left and right manifold parts 2a and a part 2b at the center where the power generation cell is provided, by joint parts 2c. The joint parts 2c have flexibility.

The manifold parts 2a has gas holes 3, 4. One gas hole 3 is connected to a fuel gas channel 3a, and the other gas hole 4 is connected to an oxygen-containing gas channel 4a. The fuel gas channel 3a and the oxygen-containing gas channel 4a extend in a spiral pattern into the part 2b, and are opened to a fuel electrode current collector and an air electrode current collector, respectively, at positions near the center of the part 2b.

In the above conventional technique, the part (sandwiching section) 2b for placing the electrolyte electrode assembly is provided at the center of the separator 1, and across the part 2b the two manifold parts 2a are provided at diagonal positions of the separator 1. In the structure, it is not possible to suitably heat the fuel gas and the oxygen-containing gas flowing through the gas holes 3, 4 by the heat produced in the power generation of the fuel cell before the gases are supplied to the electrolyte electrode assembly. The temperature difference between the fuel gas and the oxygen-containing gas before being supplied to the electrolyte electrode assembly cannot be reduced, and stable power generation in the electrolyte electrode assembly cannot be achieved.

Moreover, the manifold parts 2a where high sealing performance is required are provided separately. In the structure, the sealing pressure tends to be applied to the electrolyte electrode assembly excessively. Under the circumstances, the electrolyte electrode assembly may be damaged undesirably, and the efficient power generation and current collection may not be achieved.

Further, in the separator 1, the joint parts 2c are provided around the part 2b for placing the electrolyte electrode assembly, i.e., around the power generation area. In the structure, it becomes difficult to smoothly discharge the exhaust gas after power generation from the outer circumferential portion of the electrolyte electrode assembly.

Further, the channels of the fuel gas and the oxygen-containing gas extending from the respective manifold parts 2a to the power generation area are not straight. Therefore, the fuel gas and the oxygen-containing gas are not smoothly and efficiently supplied to the power generation area.

DISCLOSURE OF INVENTION

The present invention has been made to solve the problem of this type, and an object of the present invention is to provide a fuel cell and a fuel cell stack having simple and compact structure, in which it is possible to maintain the desired gas sealing performance, suitably arrange electrolyte electrode assemblies, improve the power generation efficiency and facilitate thermally self-sustained operation.

The present invention relates to a fuel cell formed by stacking an electrolyte electrode assembly between separators. The electrolyte electrode assembly includes an anode, a cathode, and an electrolyte interposed between the anode and the cathode.

Each of the separators includes a sandwiching section for sandwiching the electrolyte electrode assembly, a bridge, and a reactant gas supply section. The sandwiching section has a fuel gas channel for supplying a fuel gas along an electrode surface of the anode and an oxygen-containing gas channel for supplying an oxygen-containing gas along an electrode surface of a cathode separately. The bridge is connected to the sandwiching section. The bridge has a fuel gas supply channel for supplying the fuel gas to the fuel gas channel and an oxygen-containing gas supply channel for supplying the oxygen-containing gas to the oxygen-containing gas channel. The reactant gas supply section is connected to the bridge. A fuel gas supply passage for supplying the fuel gas to the fuel gas supply channel and an oxygen-containing gas supply passage for supplying the oxygen-containing gas to the oxygen-containing gas supply channel extend through the reactant gas supply section in the stacking direction.

The fuel gas supplied from the fuel gas supply passage of one of the separators to the fuel gas channel of the sandwiching section of one of the separator through the fuel gas supply channel of the bridge of the one of the separator is supplied along an electrode surface of the anode, and the oxygen-containing gas supplied from the oxygen-containing gas supply passage of another of the separators to the oxygen-containing gas channel of the sandwiching section of the other of the separators through the oxygen-containing gas supply channel of the bridge of the other of the separator is supplied along an electrode surface of the cathode.

Further, the present invention relates to a fuel cell stack formed by stacking a plurality of fuel cells in a stacking direction. Each of the fuel cells is formed by stacking an electrolyte electrode assembly between separators in a stacking direction. The electrolyte electrode assembly includes an anode, a cathode, and an electrolyte interposed between the anode and the cathode.

Each of the separators includes a sandwiching section for sandwiching the electrolyte electrode assembly, a bridge, and a reactant gas supply section. The sandwiching sections sandwich the electrolyte electrode assembly. The sandwiching section has a fuel gas channel for supplying a fuel gas along an electrode surface of the anode and an oxygen-containing gas channel for supplying an oxygen-containing gas along an electrode surface of a cathode separately. The bridge is connected to the sandwiching section. The bridge has a fuel gas supply channel for supplying the fuel gas to the fuel gas channel and an oxygen-containing gas supply channel for supplying the oxygen-containing gas to the oxygen-containing gas channel. The reactant gas supply section is connected to the bridge. A fuel gas supply passage for supplying the fuel gas to the fuel gas supply channel and an oxygen-containing gas supply passage for supplying the oxygen-containing gas to the oxygen-containing gas supply channel extend through the reactant gas supply section in the stacking direction.

The fuel gas supplied from the fuel gas supply passage of one of the separators to the fuel gas channel of the sandwiching section of one of the separator through the fuel gas supply channel of the bridge of the one of the separator is supplied along an electrode surface of the anode, and the oxygen-containing gas supplied from the oxygen-containing gas supply passage of another of the separators to the oxygen-containing gas channel of the sandwiching section of the other of the separators through the oxygen-containing gas supply channel of the bridge of the other of the separator is supplied along an electrode surface of the cathode.

In the present invention, the tightening load in the stacking direction is not transmitted between the reactant gas supply section and the sandwiching section due to the presence of the bridge. In the structure, it is possible to apply the desired load to the electrolyte electrode assembly. Therefore, with the simple and compact structure, it is possible to apply a relatively large load to a position where high sealing performance is required, and apply a relatively small load to the electrolyte electrode assembly such that the electrolyte electrode assembly and the sandwiching section sufficiently tightly contact each other. With this structure, it is possible to maintain the desired sealability at the reaction gas supply section, while preventing the damage as much as possible.

Further, the fuel gas supply channel and the oxygen-containing gas supply channel are formed in the bridge. Therefore, the temperature difference between the fuel gas and the oxygen-containing gas before the fuel gas and the oxygen-containing gas are supplied to the electrolyte electrode assembly is reduced, and power generation is stably carried out in the electrolyte electrode assembly.

Further, the fuel gas supply passage and the oxygen-containing gas supply passage extend through the reactant gas supply section. Therefore, the temperature difference between the fuel gas and the oxygen-containing gas before the fuel gas and the oxygen-containing gas are supplied to the electrolyte electrode assembly is reduced, and power generation is stably carried out in the electrolyte electrode assembly.

Further, the fuel gas supply passage and the oxygen-containing gas supply passage where sealing is required are locally provided in the reactant gas supply section. Thus, the desired sealing performance is achieved in the reactant gas supply section, and it becomes possible to prevent damages in the electrolyte electrode assembly as much as possible. Accordingly, the efficient power generation and current collection are carried out.

BEST MODE FOR CARRYING OUT THE INVENTION

Figure 1:
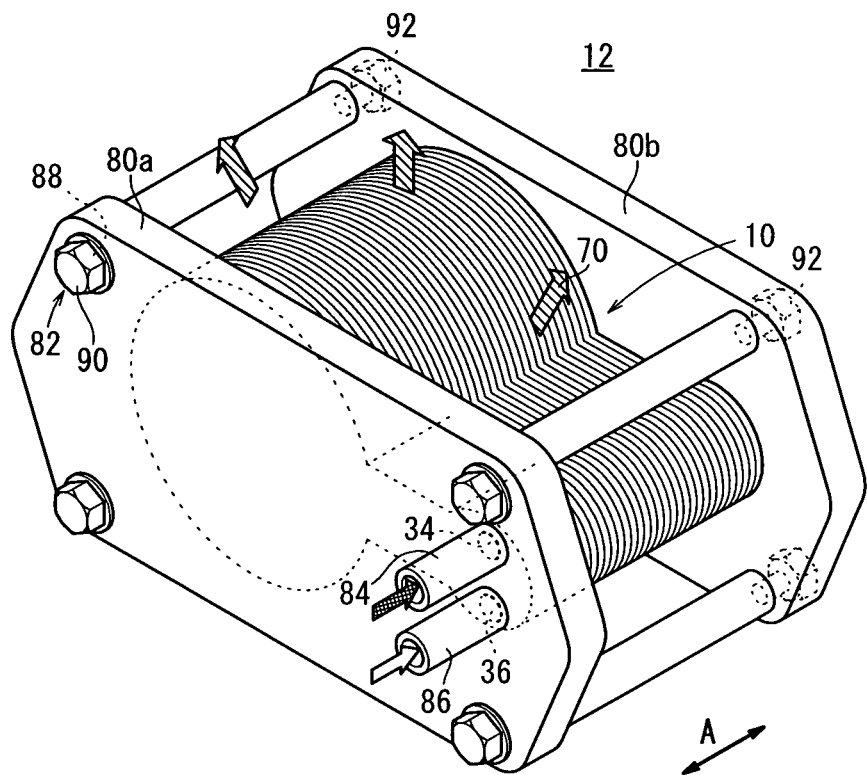
FIG. 1 is a perspective view schematically showing a fuel cell stack formed by stacking a plurality of fuel cells according to a first embodiment of the present invention.

As shown in FIG. 1, a plurality of fuel cells 10 according to a first embodiment of the present invention are stacked together to form a fuel cell stack 12.

Figure 2:
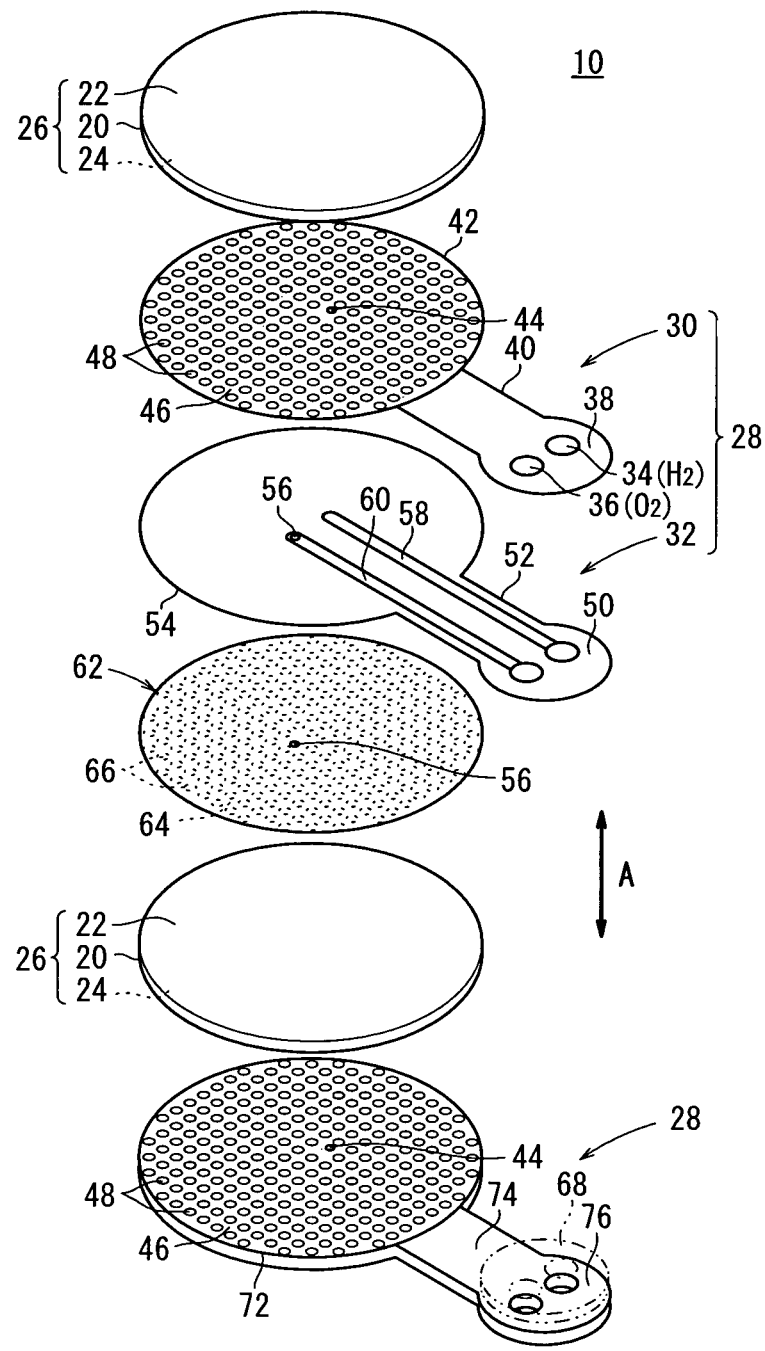
FIG. 2 is an exploded perspective view showing the fuel cell stack.
Figure 3:
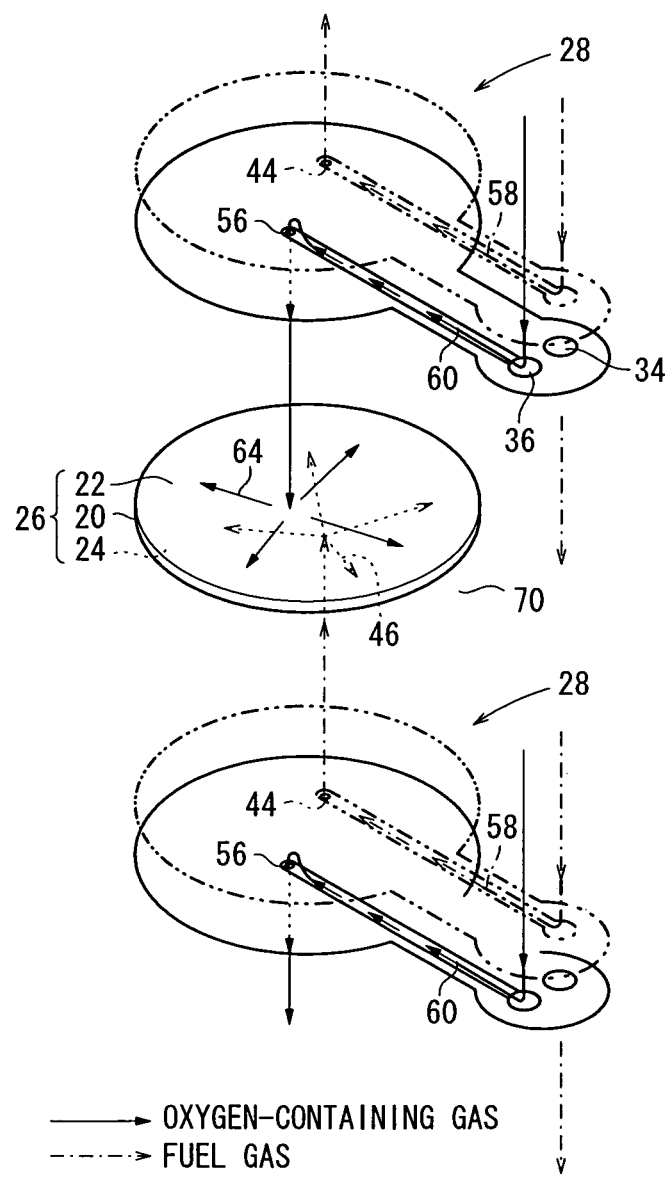
FIG. 3 is a partial exploded perspective view showing gas flows in the fuel cell.

The fuel cell 10 is a solid oxide fuel cell (SOFC) used in various applications, including stationary and mobile applications. For example, the fuel cell 10 is mounted on a vehicle. As shown in FIGS. 2 and 3, the fuel cell 10 includes electrolyte electrode assemblies (MEAs) 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape. A barrier layer (not shown) is provided at least at the outer circumferential edge of the electrolyte electrode assembly 26 for preventing entry or discharge of the oxygen-containing gas and the fuel gas.

The fuel cell 10 is formed by sandwiching a single electrolyte electrode assembly 26 between a pair of separators 28. Each of the separators 28 includes first and second plates 30, 32. The first and second plates 30, 32 are metal plates of, e.g., stainless alloy. For example, the first plate 30 and the second plate 32 are joined to each other by diffusion bonding, laser welding, or brazing.

The first plate 30 includes a first reactant gas supply section 38. A fuel gas supply passage 34 for supplying a fuel gas and an oxygen-containing gas supply passage 36 for supplying an oxygen-containing gas extend through the first reactant gas supply section 38 in the stacking direction indicated by an arrow A. The first reactant gas supply section 38 is integral with a first sandwiching section 42 having a relatively large diameter through a narrow first bridge 40.

The first sandwiching section 42 has a circular disk shape, having substantially the same dimensions as the electrolyte electrode assembly 26. A fuel gas inlet 44 for supplying the fuel gas is formed in the first sandwiching section 42, e.g., at a position deviated from the center of the first sandwiching section 42. The first sandwiching section 42 has a large number of projections 48 on a surface which contacts the anode 24. A fuel gas channel 46 for supplying the fuel gas is formed by the projections 48. For example, the projections 48 are formed by, e.g., etching, and function as a current collector.

The second plate 32 includes a second reactant gas supply section 50. The fuel gas supply passage 34 and the oxygen-containing gas supply passage 36 extend through the second reactant gas supply section 50. The second reactant gas supply section 50 is integral with a second sandwiching section 54 having a relatively large diameter through a narrow second bridge 52. An oxygen-containing gas inlet 56 for supplying the oxygen-containing gas is formed in the second sandwiching section 54, e.g., at a position deviated from the center of the second sandwiching section 54, oppositely to the fuel gas inlet 44 in the first sandwiching section 42.

A fuel gas supply channel 58 for supplying the fuel gas from the fuel gas supply passage 34 to the fuel gas inlet 44 and an oxygen-containing gas supply channel 60 for supplying the oxygen-containing gas from the oxygen-containing gas supply passage 36 to the oxygen-containing gas inlet 56 are formed in the second bridge 52. The fuel gas supply channel 58 and the oxygen-containing gas supply channel 60 may be provided in the first bridge 40 of the first plate 30. Also in second and other embodiments as described later, the fuel gas supply channel 58 and the oxygen-containing gas supply channel 60 may be provided in the first bridge of the first plate.

A plate 62 having a circular disk shape is fixed on a surface of the second sandwiching section 54 which contacts the cathode 22, e.g., by brazing, diffusion bonding, laser brazing. A plurality of projections 66 are formed in the plate 62 by, e.g., pressure forming, or etching. An oxygen-containing gas channel 64 for supplying the oxygen-containing gas along the electrode surface of the cathode 22 is formed by the projections 66. An oxygen-containing gas inlet 56 is formed in the plate 62.

An insulating seal 68 for sealing the fuel gas supply passage 34 and the oxygen-containing gas supply passage 36 is provided between the separators 28. For example, crustal component material such as mica material, glass material, and composite material of clay and plastic may be used for the insulating seal 68. An exhaust gas channel 70 is provided around the first sandwiching section 42 and the second sandwiching section 54.

As shown in FIG. 2, the separator 28 has a sandwiching section 72 having a circular disk shape by joining the first sandwiching section 42 of the first plate 30 and the second sandwiching section 54 (including the plate 62) of the second plates 32. The sandwiching section 72 is connected to a bridge 74 formed by joining a first bridge 40 and a second bridge 52. The bridge 74 is connected to a reactant gas supply section 76 formed by joining the first reactant gas supply section 38 and the second reactant gas supply section 50.

As shown in FIG. 1, the fuel cell stack 12 includes end plates 80a, 80b provided at opposite ends of the fuel cells 10 in the stacking direction. The end plate 80a or the end plate 80b is electrically insulated from tightening means 82. A first pipe 84 and a second pipe 86 extend through the end plate 80a. The first pipe 84 is connected to the fuel gas supply passage 34 of the fuel cell 10, and the second pipe 86 is connected to the oxygen-containing gas supply passage 36 of the fuel cell 10. The tightening means 82 applies a tightening load to the electrolyte electrode assembly 26 and the separators 28 stacked in the direction indicated by the arrow A.

The tightening means 82 includes bolt holes 88 formed in the end plates 80a, 80b. Tightening bolts 90 are inserted into the bolt holes 88, and tip ends of the respective tightening bolts 90 are screwed into nuts 92 for tightening the fuel cell stack 12. In the structure, when the tightening load for sealing is applied to positions near the first reactant gas supply section 38 and the second reactant gas supply section 50 by the tightening means 82, no excessive tightening load is applied to the electrolyte electrode assembly 26 sandwiched between the first sandwiching section 42 and the second sandwiching section 54.

Next, operation of the fuel cell stack 12 will be described below.

As shown in FIG. 1, a fuel gas (e.g., hydrogen-containing gas) is supplied to the first pipe 84 connected to the end plate 80a, and the fuel gas flows from the first pipe 84 to the fuel gas supply passage 34. An oxygen-containing gas (hereinafter also referred to as the air) is supplied to the second pipe 86 connected to the end plate 80a, and the oxygen-containing gas flows from the second pipe 86 to the oxygen-containing gas supply passage 36.

Figure 4:
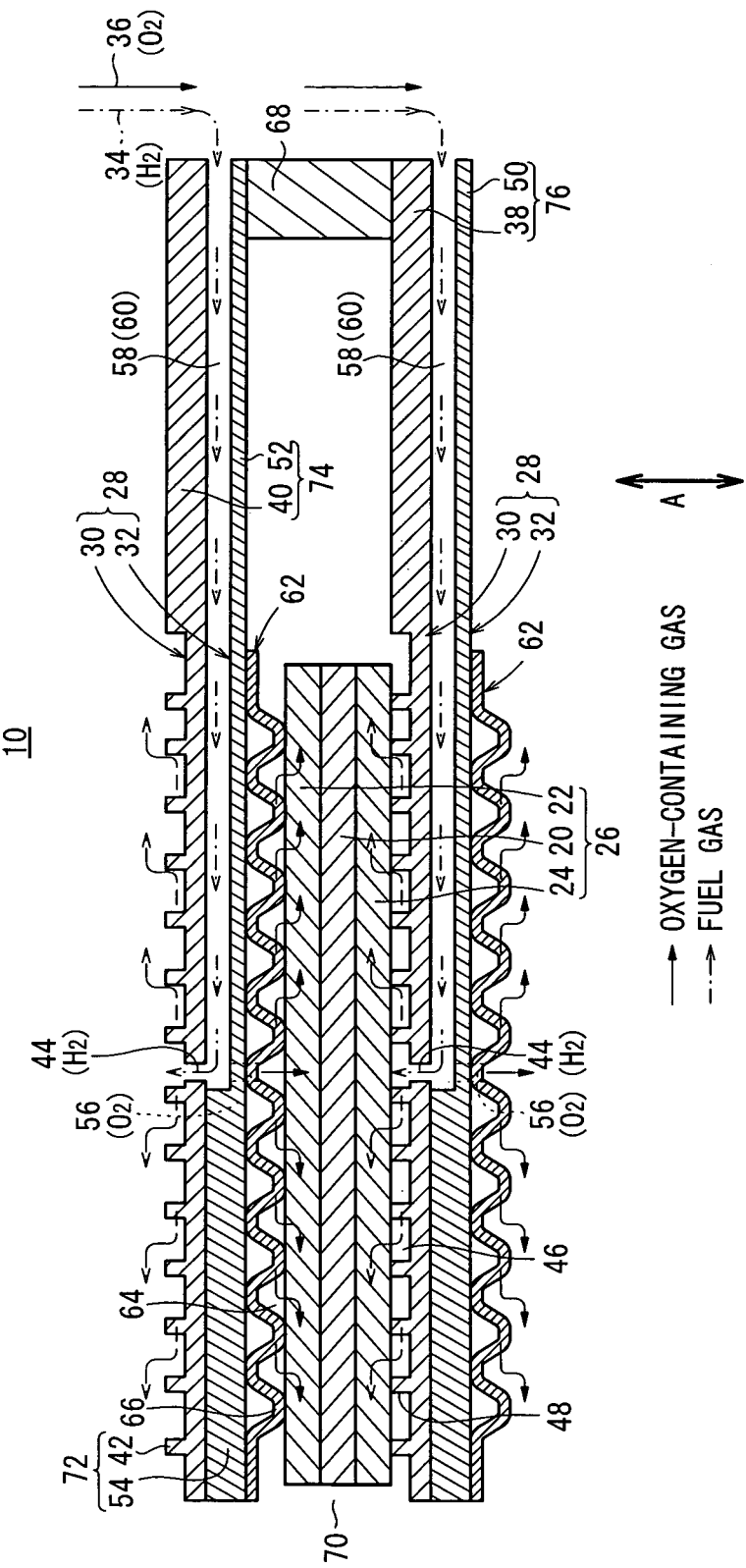
FIG. 4 is a cross sectional view schematically showing operation of the fuel cell.

As shown in FIGS. 3 and 4, the fuel gas flows along the fuel gas supply passage 34 of the fuel cell stack 12 in the stacking direction indicated by the arrow A, and then, the fuel gas flows through the fuel gas supply channel 58 provided in each of the fuel cells 10 along the surface of the separator 28.

The fuel gas from the fuel gas supply channel 58 flows through the fuel gas inlet 44 formed in the first sandwiching section 42, and flows into the fuel gas channel 46. The fuel gas inlet 44 is provided at a position corresponding substantially to the central position of the anode 24. Therefore, after the fuel gas flows from the fuel gas inlet 44 to substantially the central position of the anode 24, the fuel gas flows along the fuel gas channel 46 toward the outer circumferential region of the anode 24.

In the meanwhile, the air flows along the oxygen-containing gas supply passage 36 of the fuel cell stack 12 in the stacking direction indicated by the arrow A, and then, the oxygen-containing gas flows through the oxygen-containing gas supply channel 60 provided in each of the fuel cells 10 along the surface of the separator 28.

The air from the oxygen-containing gas supply channel 60 flows through the oxygen-containing gas inlet 56 formed in the second sandwiching section 54 and the plate 62 into the oxygen-containing gas channel 64. The oxygen-containing gas inlet 56 is provided at a position corresponding substantially to the central position of the cathode 22. Therefore, after the air flows from the oxygen-containing gas inlet 56 to substantially the central position of the cathode 22, the air flows along the oxygen-containing gas channel 64 toward the outer circumferential region of the cathode 22.

Thus, in the electrolyte electrode assembly 26, the fuel gas is supplied from the central region of the anode 24 to the outer circumferential region of the anode 24, and the air is supplied from the central region of the cathode 22 to the outer circumferential region of the cathode 22. At this time, oxide ions flow through the electrolyte 20, and electricity is generated by electrochemical reactions.

The exhaust gas which chiefly contains the air after power generation reaction is discharged from the outer circumferential region of the electrolyte electrode assembly 26 is discharged as an off gas from the fuel cell stack 12 through the exhaust gas channel 70 (see FIG. 1).

In the first embodiment, the tightening load in the stacking direction is not transmitted between the reactant gas supply section 76 and the sandwiching section 72 due to the presence of the bridge 74. In the structure, it is possible to apply the desired load to the electrolyte electrode assembly 26. Therefore, with the simple and compact structure, it is possible for the fuel cell 10 and the fuel cell stack 12 to apply a relatively large load to a position where high sealing performance is required, and apply a relatively small load to the electrolyte electrode assembly 26 such that the electrolyte electrode assembly 26 and the sandwiching section 72 sufficiently tightly contact each other.

Thus, the desired sealing performance is achieved in the reactant gas supply section 76, and it becomes possible to prevent damages in the electrolyte electrode assembly 26 as much as possible. Accordingly, the efficient power generation and current collection are carried out.

Further, the fuel gas supply channel 58 and the oxygen-containing gas supply channel 60 are formed in the bridge 74. Therefore, the temperature difference between the fuel gas and the oxygen-containing gas before the fuel gas and the oxygen-containing gas are supplied to the electrolyte electrode assembly 26 is reduced, and power generation is stably carried out in the electrolyte electrode assembly 26.

Further, the fuel gas supply passage 34 and the oxygen-containing gas supply passage 36 are formed in the reactant gas supply section 76. Therefore, the temperature difference between the fuel gas and the oxygen-containing gas before the fuel gas and the oxygen-containing gas are supplied to the electrolyte electrode assembly 26 is reduced, and power generation is stably carried out in the electrolyte electrode assembly 26.

Further, the fuel gas supply passage 34 and the oxygen-containing gas supply passage 36 where sealing is required are locally provided in the reactant gas supply section 76. Thus, the desired sealing performance is achieved in the reactant gas supply section 76, and it becomes possible to prevent damages in the electrolyte electrode assembly 26 as much as possible. Accordingly, the efficient power generation and current collection are carried out.

Further, in the sandwiching section 72, a plurality of projections 48 protruding on the side of the fuel gas channel 46 to contact the anode 24 are provided. In the structure, the desired current collection effect is achieved by the projections 48. The fuel gas suitably flows into, and flows out of the fuel gas channel 46 between the projections 48.

Further, in the sandwiching section 72, a plurality of projections 66 protruding on the side of the oxygen-containing gas channel 64 to contact the cathode 22 are provided. In the structure, the desired current collection effect is achieved by the projections 66. The oxygen-containing gas suitably flows into, and flows out of the oxygen-containing gas channel 64 between the projections 66.

Further, the fuel cell 10 is a solid oxide fuel cell. By applying the present invention to the fuel cell operated at high temperature, heat distortion or the like which is particularly concerned in the sandwiching section 72 and the electrolyte electrode assembly 26 is not transmitted between the adjacent sandwiching sections 72 and the adjacent electrolyte electrode assemblies 26. Thus, no special dimensional absorption mechanism needs to be provided between the sandwiching sections 72 or the electrolyte electrode assemblies 26. Reduction in the sizes of the fuel cell 10 and the fuel cell stack 12 is achieved easily.

Figure 5:
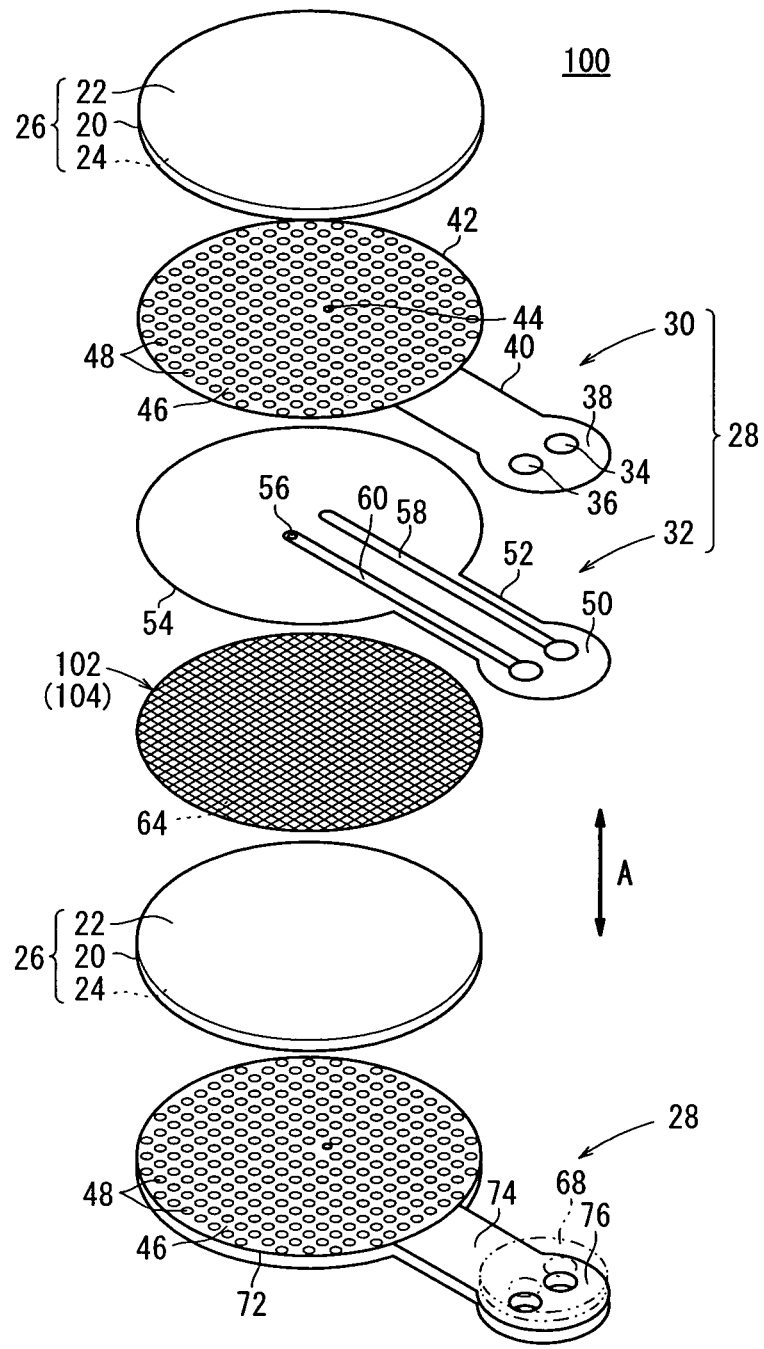
FIG. 5 is an exploded perspective view showing a fuel cell according to a second embodiment of the present invention.

FIG. 5 is an exploded perspective view showing a fuel cell 100 according to a second embodiment of the present invention. The constituent elements that are identical to those of the fuel cell 10 according to the first embodiment are labeled with the same reference numeral, and description thereof will be omitted. Further, also in embodiments from the third embodiment as described later, the constituent elements that are identical to those of the fuel cell 10 according to the first embodiment are labeled with the same reference numeral, and detailed description thereof will be omitted.

The fuel cell 100 includes separators 28, and a mesh member (electrically conductive woven fabric such as metal mesh) 102 is provided on a surface of the second plate 32 of the separator 28 facing the cathode 22. An oxygen-containing gas channel 64 is formed in the mesh member 102.

In the second embodiment, the same advantages as in the case of the first embodiment are obtained. For example, structure of the separator 28 is further simplified advantageously. Though the mesh member 102 is used in the second embodiment, instead of the mesh member 102, for example, an electrically conductive felt member (electrically conductive nonwoven fabric such as metal felt) 104, foamed metal, expanded metal, punching metal, or pressure embossed metal may be used.

Figure 6:
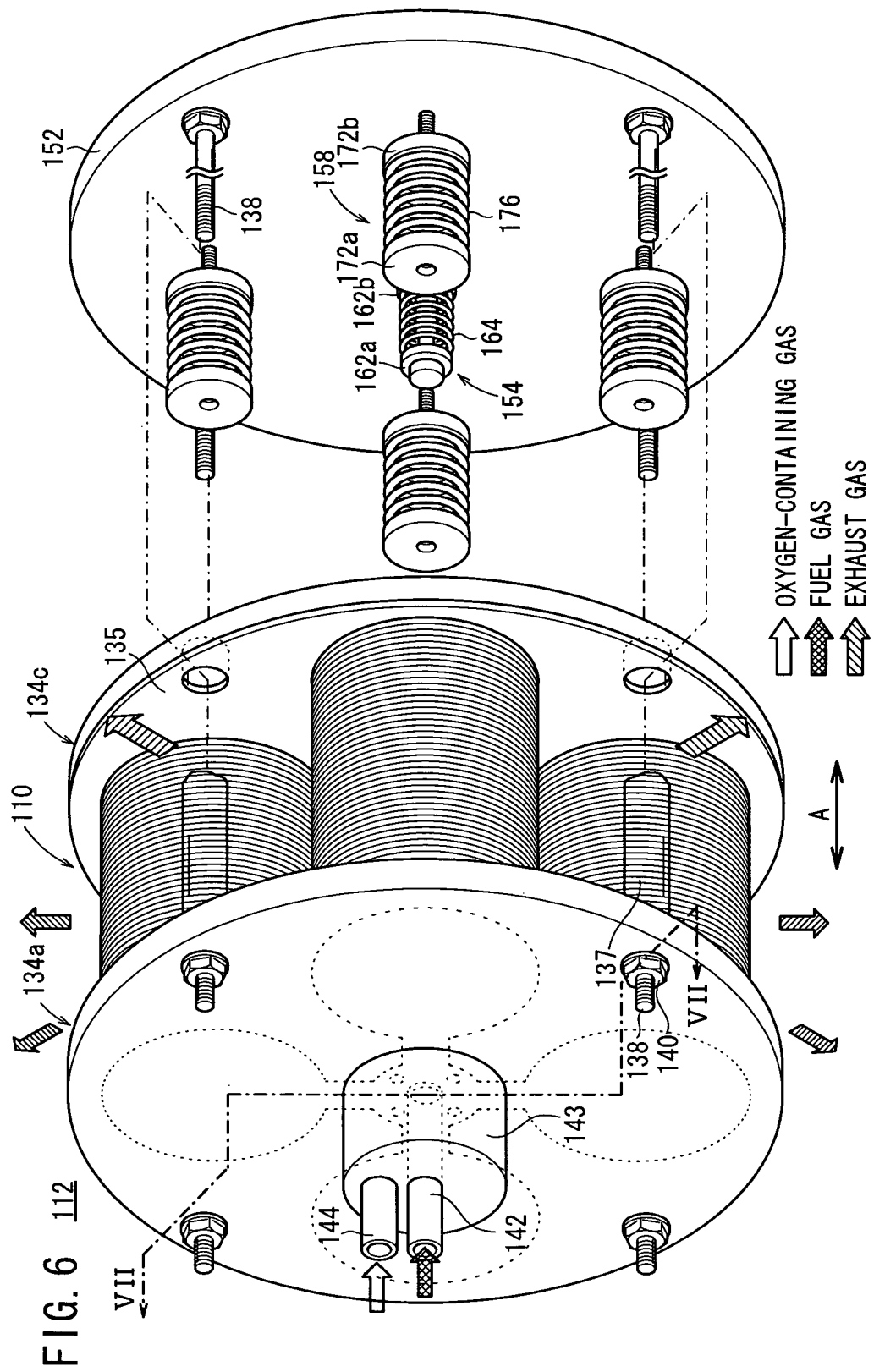
FIG. 6 is a perspective view schematically showing a fuel cell stack formed by stacking a plurality of fuel cells according to a third embodiment of the present invention.
Figure 7:
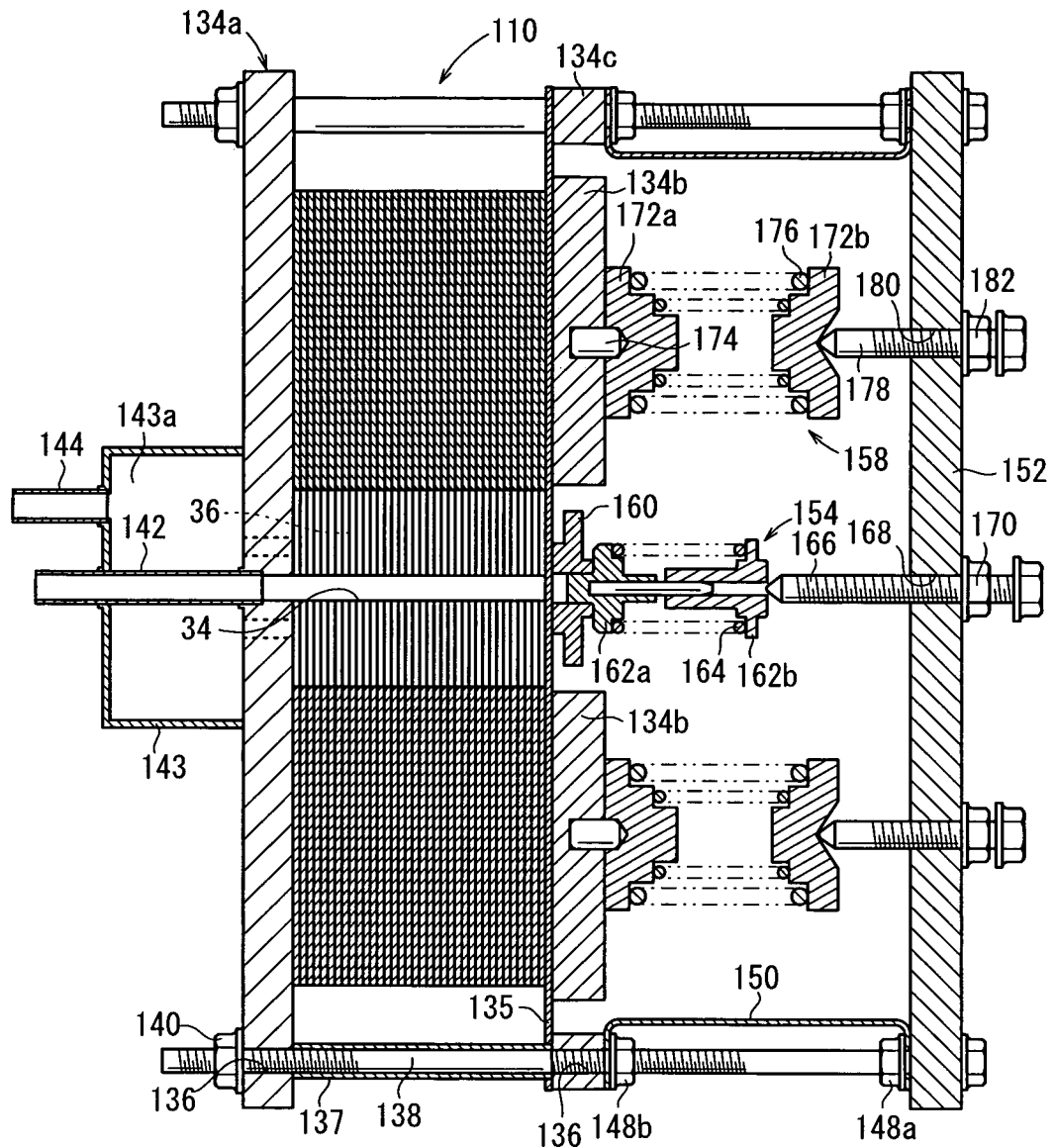
FIG. 7 is a cross sectional view showing the fuel cell stack, taken along a line VII-VII in FIG. 6.

FIG. 6 is a perspective view schematically showing a fuel cell stack 112 formed by stacking a plurality of fuel cells 110 according to a third embodiment in a direction indicated by an arrow A. FIG. 7 is a cross sectional view showing the fuel cell stack 112, taken along a line VII-VII in FIG. 6.

Figure 8:
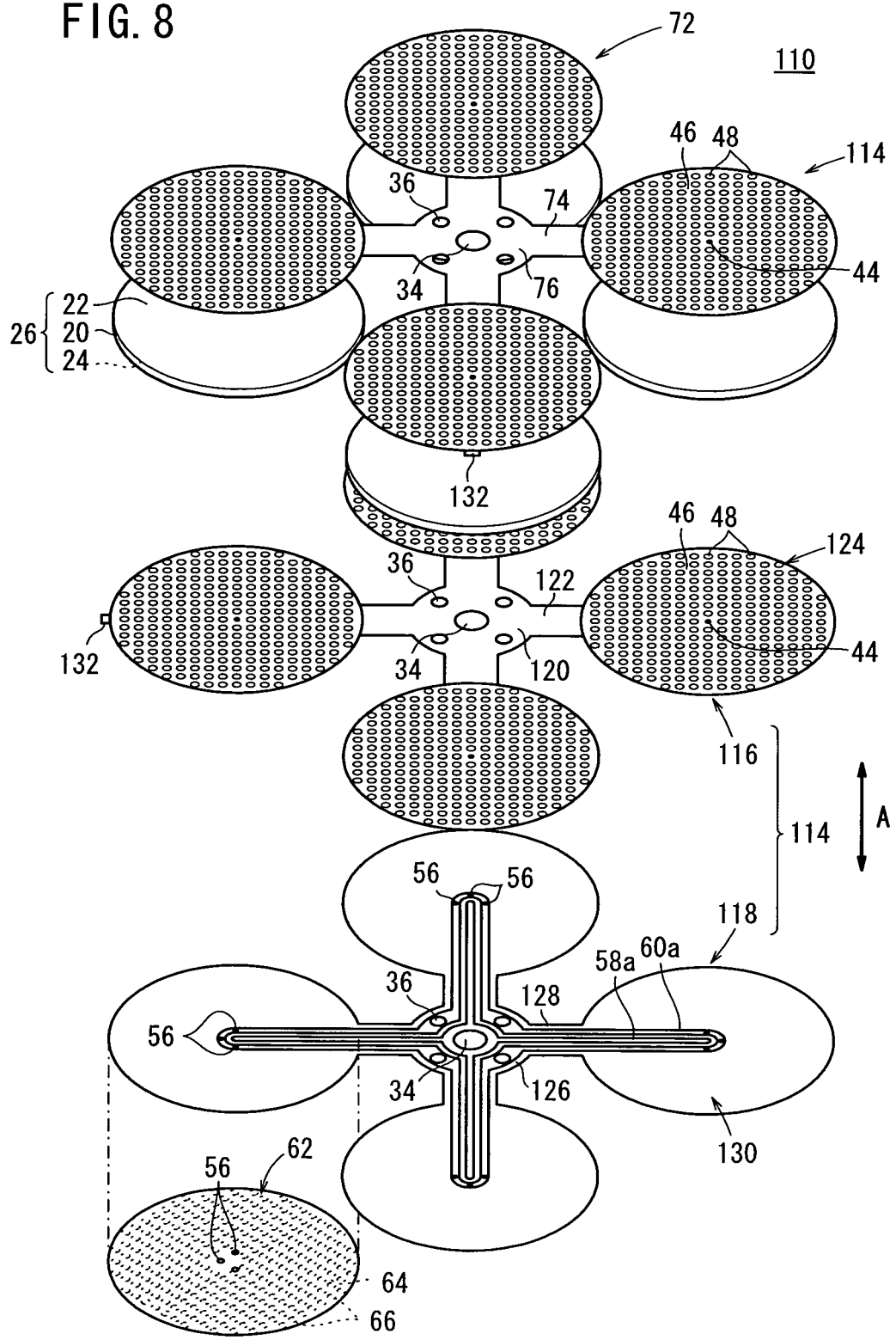
FIG. 8 is an exploded perspective view showing the fuel cell.

As shown in FIG. 8, four electrolyte electrode assemblies 26 sandwiched between separator 114, and the electrolyte electrode assemblies 26 are arranged concentrically around the reactant gas supply section 76 provided at the center of the separators 114.

The separator 114 includes a first plate 116 and a second plate 118, and each of the first plate 116 and second plate 118 includes, for example, a metal plate of, e.g., stainless alloy. A first fuel gas supply section 120 is formed in the first plate 116, and the fuel gas supply passage 34 extends through the center of the first reactant gas supply section 120. A plurality of, e.g., four oxygen-containing gas supply passages 36 are arranged in a circle around the fuel gas supply passage 34. The total flow field cross sectional area of the four oxygen-containing gas supply passages 36 is larger than the flow field cross sectional area of the fuel gas supply passage 34.

Four first bridges 122 extend radially outwardly from the first reactant gas supply section 120 at equal intervals, e.g., 90°. The first fuel gas supply section 120 is integral with first sandwiching sections 124 each having a relatively large diameter through the first bridges 122. The centers of the first sandwiching sections 124 are equally distanced from the center of the first fuel gas supply section 120. Each of the oxygen-containing gas supply passages 36 is provided in each space between the first bridges 122.

Each of the first sandwiching sections 124 has a circular disk shape, having substantially the same dimensions as the electrolyte electrode assembly 26. The first sandwiching sections 124 are separated from each other. A fuel gas inlet 44 for supplying the fuel gas is formed, e.g., at the center of the first sandwiching section 124. A large number of projections 48 are formed in a surface of the first sandwiching section 124 which contacts the anode 24, and the fuel gas channel 46 is formed by the projections 48.

A second reactant gas supply section 126 is formed in the second plate 118, and the fuel gas supply passage 34 extends through the center of the second reactant gas supply section 126. A plurality of, e.g., four oxygen-containing gas supply passages 36 are arranged in a circle around the fuel gas supply passage 34.

Four second bridges 128 extend radially outwardly from the second reactant gas supply section 126 at equal intervals, e.g., 90°. The second fuel gas supply section 126 is integral with second sandwiching sections 130 each having a relatively large diameter through the second bridges 128. A plate 62 is joined to a surface of the second sandwiching section 130 facing the cathode 22 to form the oxygen-containing gas channel 64.

Four fuel gas supply channels 58a for supplying the fuel gas from the fuel gas supply passage 34 to the fuel gas inlets 44 and four pairs of oxygen-containing gas supply channels 60a for supplying the oxygen-containing gas from the oxygen-containing gas supply passage 36 to the oxygen containing gas inlets 56 are provided in the second bridge 128.

Two oxygen-containing gas supply channels 60a are provided in each of the second bridges 128. In each second sandwiching section 130, the oxygen-containing gas supply channels 60a are connected together. The fuel gas supply channel 58a is provided between the two oxygen-containing gas supply channels 60a. Three oxygen-containing gas inlets 56 are provided in the second sandwiching section 130 at positions where the two oxygen-containing gas supply channels 60a are merged together, around the fuel gas inlet 44 (see FIG. 9).

The separator 114 is formed by joining the first plate 116 and the second plate 118 together, and includes four sandwiching sections 72 each having a circular disk shape, four bridges 74 connected to the respective sandwiching sections 72, and a single reactant gas supply section 76 connected to the bridges 74. The separator 114 includes an extension 132 extending from the outer circumferential portion of each of at least one of the sandwiching sections 72 for collecting electrical energy generated in the four electrolyte electrode assemblies 26 (i.e., the fuel cell 110).

As shown in FIGS. 6 and 7, the fuel cell stack 112 includes a first end plate 134a having a substantially circular disk shape at one end in the stacking direction of the fuel cells 110. Further, the fuel cell stack 112 includes a plurality of second end plates 134b and a fixing ring 134c at the other end in the stacking direction of the fuel cells 110, through a partition wall 135. Each of the second end plates 134b has a small diameter, and a substantially circular shape, and the fixing ring 134c has a large diameter, and a substantially ring shape. The partition wall 135 prevents diffusion of the exhaust gas to the outside of the fuel cells 110. The number of second end plates 134b is four, corresponding to the positions of stacking the electrolyte electrode assemblies 26.

The first end plate 134a and the fixing ring 134c include a plurality of holes 136. Bolts 138 are inserted into the holes 136 and bolt insertion collar members 137, and screwed into nuts 140. By the bolts 138 and the nuts 140, the first end plate 134a and the fixing ring 134c are fixedly tightened together.

One fuel gas supply pipe 142, a casing 143, and one oxygen-containing gas supply pipe 144 are provided at the first end plate 134a. The fuel gas supply pipe 142 is connected to the fuel gas supply passage 34. The casing 143 has a cavity 143a connected to the respective oxygen-containing gas supply passages 36. The oxygen-containing gas supply pipe 144 is connected to the casing 143, and to the cavity 143a.

A support plate 152 is fixed to the first end plate 134a through a plurality of bolts 138, nuts 148a, 148b, and plate collar members 150. A first load applying unit 154 for applying a tightening load to the reactant gas supply section 76, and second load applying units 158 for applying a tightening load to each of the electrolyte electrode assemblies 26 are provided between the support plate 152 and the first end plate 134a. The first load applying unit 154 and the second load applying units 158 form a load applying mechanism. The first load applying unit 154 applies a large force in comparison with the second load applying unit 158.

The first load applying unit 154 includes a presser member 160 provided at the center of the fuel cells 110 for preventing leakage of the fuel gas and the oxygen-containing gas from the reaction gas supply section 76. The presser member 160 is provided near the center of the four second end plates 134b for pressing the fuel cells 110 through the partition wall 135. A first spring 164 is provided at the presser member 160 through a first receiver member 162a and a second receiver member 162b. A tip end of the first presser bolt 166 contacts the second receiver member 162b. The first presser bolt 166 is screwed into a first screw hole 168 formed in the support plate 152. The position of the first presser bolt 166 is adjustable through a first nut 170.

Each of the second load applying units 158 includes a third receiver member 172a at the second end plate 134b, corresponding to each of the electrolyte electrode assemblies 26. The third receiver member 172a is positioned on the second end plate 134b through the pin 174. One end of the second spring 176 contacts the third receiver member 172a and the other end of the second spring 176 contacts the fourth receiver member 172b. A tip end of the second presser bolt 178 contacts the fourth receiver member 172b. The second presser bolt 178 is screwed into the second screw hole 180 formed in the support plate 152. The position of the second presser bolt 178 is adjustable through the second nut 182.

Operation of the fuel cell stack 112 will be described below.

As shown in FIG. 6, the fuel gas is supplied through the fuel gas supply pipe 142 to the first end plate 134a. Then, the fuel gas flows into the fuel gas supply passage 34. The air as the oxygen-containing gas is supplied from the oxygen-containing gas supply pipes 144 to each of the oxygen-containing gas supply passages 36 through the cavity 143a.

Figure 9:
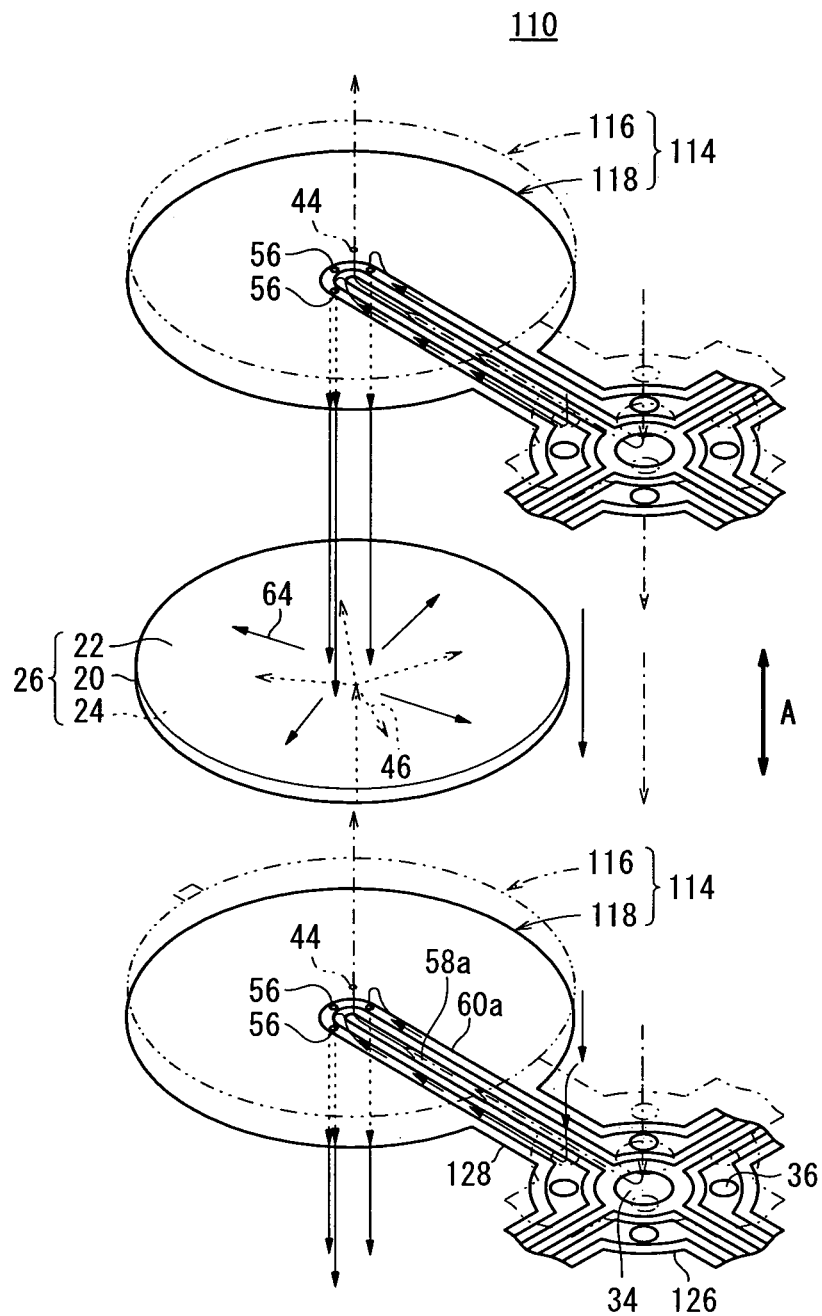
FIG. 9 is a partial exploded perspective view showing gas flows in the fuel cell.
Figure 10:
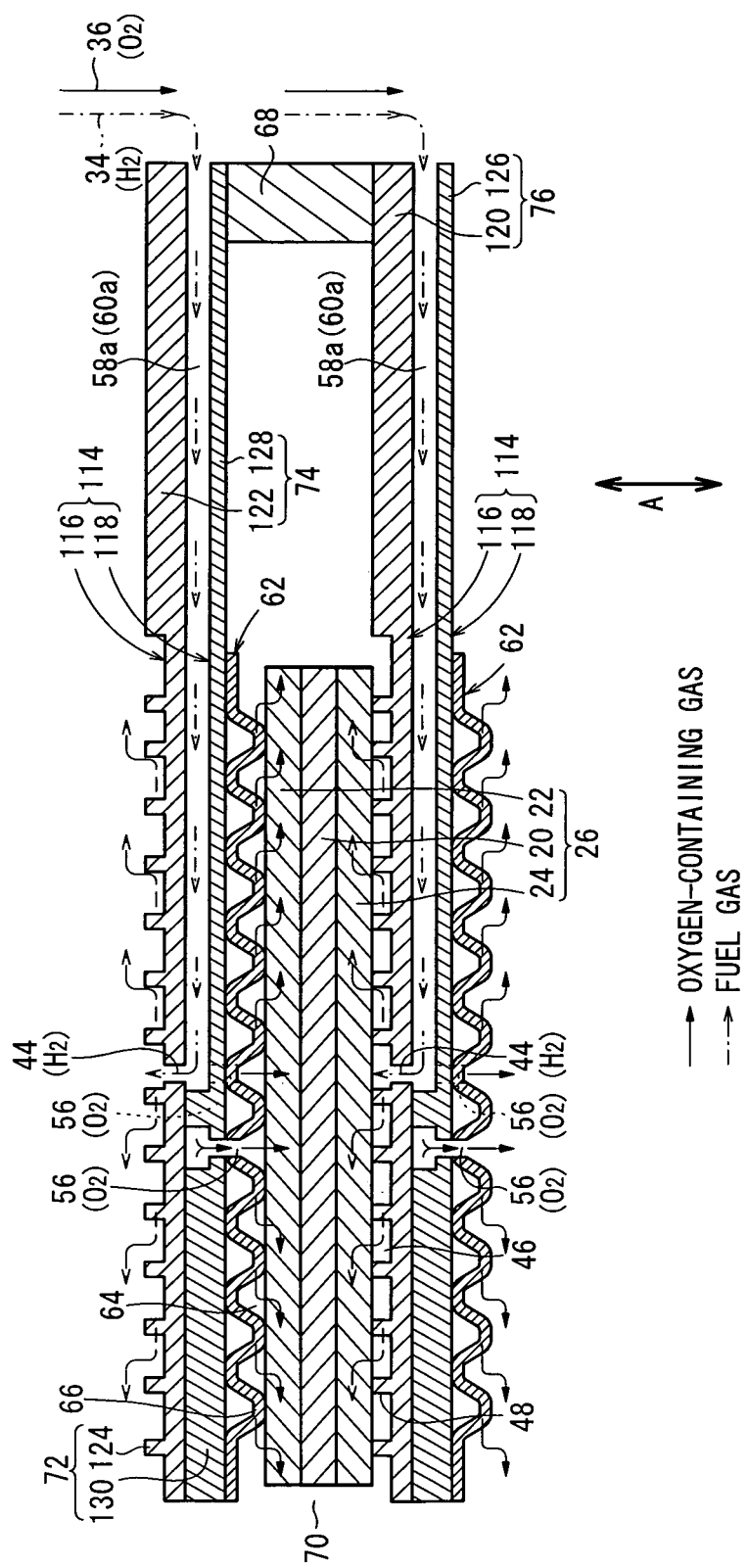
FIG. 10 is a cross sectional view schematically showing operation of the fuel cell.

As shown in FIGS. 9 and 10, the fuel gas flows along the fuel gas supply passage 34 of the fuel cell stack 112 in the stacking direction indicated by the arrow A. The fuel gas moves through the fuel gas supply channel 58a of each fuel cell 110 along the surface of the separator 114. The fuel gas flows from the fuel gas supply channel 58a into the fuel gas channel 46 through the fuel gas inlet 44 formed in the sandwiching section 72. The fuel gas flows along the fuel gas channel 46 toward the outer circumferential region of the anode 24.

The air supplied to the oxygen-containing gas supply passage 36 flows through the oxygen-containing gas supply channel 60a provided in each of the fuel cells 110, and moves along the surface of the separator 114. The air from the oxygen-containing gas supply channel 60a flows into the three oxygen-containing gas inlets 56 formed in the sandwiching section 72, and flows along the oxygen-containing gas channel 64 toward the outer circumferential region of the cathode 22.

Thus, in each of the electrolyte electrode assemblies 26, the fuel gas flows from the center to the outer circumferential side on the electrode surface of the anode 24, and the oxygen-containing gas flows from substantially the center to the outer circumferential side of the cathode 22. At this time, oxygen ions flow through the electrolyte 20 toward the anode 24 for generating electricity by electrochemical reactions.

In the third embodiment, the reactant gas supply section 76 is provided at the center of the separator 114, and a plurality of, e.g., four electrolyte electrode assemblies 26 are arranged in a circle around the reactant gas supply section 76. In the structure, the fuel gas and the oxygen-containing gas to be supplied to the electrolyte electrode assemblies 26 are suitably heated by heat generated in power generation of the electrolyte electrode assemblies 26. Thus, it is possible to improve the heat efficiency and facilitate the thermally self-sustained operation of the fuel cells 110.

The thermally self-sustained operation herein means that the operating temperature of the fuel cell 110 is maintained using only the heat generated by the fuel cell 110 without requiring any heat from the outside.

Further, the fuel gas and the oxygen-containing gas are distributed uniformly to each of the electrolyte electrode assemblies 26. Thus, improvement and stability in the power generation performance can be achieved in each of the electrolyte electrode assemblies 26.

Further, the sandwiching sections 72 have a circular disk shape in correspondence with the respective electrolyte electrode assemblies 26, and separated from each other. In the structure, since the sandwiching sections 72 have a circular disk in correspondence with the electrolyte electrode assemblies 26, it becomes possible to efficiently collect electrical energy generated in the electrolyte electrode assemblies 26.

Further, since the sandwiching sections 72 are separated from each other and the load in the stacking direction is transmitted to each of the sandwiching sections independently, it becomes possible to avoid excessive load applied only to one of the electrolyte electrode assemblies 26 due to dimensional differences in the electrolyte electrode assemblies 26 and the separators 114. Thus, the undesired distortion does not occur in the entire separators 114. It is possible to apply the load equally to each of the electrolyte electrode assemblies 26.

Further, thermal distortion or the like of the electrolyte electrode assemblies 26 is not transmitted to the adjacent, other electrolyte electrode assemblies 26, and no dedicated dimensional variation absorbing mechanisms are required between the electrolyte electrode assemblies 26. Thus, the electrolyte electrode assemblies 26 can be provided close to each other, and the overall size of the fuel cell 110, and the fuel cell stack 112 can be reduced easily.

Further, in the separator 114, since the extension 132 is provided in at least one of the sandwiching sections 72 for collecting electrical energy generated in the electrolyte electrode assemblies 26, abnormal conditions (degradation or damages) in the electrolyte electrode assemblies 26 are detected rapidly, and the extension can be suitably used as a terminal for the thin metal plate separator 114 to meet the needs for reducing the size of the fuel cell 100 and the fuel cell stack 112.

Further, for example, the four bridges 74 are provided, and the bridges 74 extend radically outwardly from the reactant gas supply section 76 such that the bridges 74 are spaced at equal angular intervals (angles of 90°). In the structure, the fuel gas and the oxygen-containing gas are supplied from the fuel gas supply section 76 equally to the respective electrolyte electrode assemblies 26 through the bridges 74. Thus, improvement and stability in the power generation performance can be achieved in each of the electrolyte electrode assemblies 26.

Further, for example, the two oxygen-containing gas supply channels 60a and the fuel gas supply channel 58 interposed between the oxygen-containing gas supply channels 60a are provided in each of the bridges 74. In the structure, the total flow field cross sectional area of the oxygen-containing gas supply channel 60a is larger than the total flow field cross sectional area of the fuel gas supply channel 58a. Therefore, in particular, in the fuel cell 110 having a large A/F ratio (air/fuel gas), the difference in the pressure losses between the fuel gas and the oxygen-containing gas is reduced, and the durability and reliability of the fuel cell 110 are improved advantageously.

Further, in the separator 114, the number of the sandwiching sections 72 and the bridges 74 correspond to the number (e.g., four) of the electrolyte electrode assemblies 26. In the structure, the fuel gas and the oxygen-containing gas are supplied from the reactant gas supply section 76 equally to the respective electrolyte electrode assemblies 26 through the sandwiching sections 72 and the bridges 74. Thus, improvement and stability in the power generation performance can be achieved in each of the electrolyte electrode assemblies 26.

Further, the fuel gas supply passage 34 extends through the center of the reactant gas supply section 76, and a plurality of, e.g., the four oxygen-containing gas supply passages 36 extend through the reactant gas supply section 76 concentrically around the fuel gas supply passage 34. In the structure, the temperature difference between the fuel gas and the oxygen-containing gas to be supplied to the electrolyte electrode assemblies 26 is reduced, and stable power generation in the electrolyte electrode assemblies 26 is achieved. The total flow field cross sectional area of the four oxygen-containing gas supply passages 36 is larger than the flow field cross sectional area of the fuel gas supply passage 34. Therefore, in particular, in the fuel cell 110 having a large A/F ratio (air/fuel gas), the difference in the pressure losses between the fuel gas and the oxygen-containing gas is reduced, and the durability and reliability of the fuel cell 110 are improved advantageously.

Further, a plurality of the bridges 74 are provided, and the oxygen-containing gas supply passages 36 extend through respective spaces between the bridges 74. In the structure, further reduction in the size of the fuel cell 110, and thus, the fuel cell stack 112 is achieved.

Further, the number of the oxygen-containing gas supply passages 36 corresponds to the number (e.g., four) of the electrolyte electrode assemblies 26. In the structure, the oxygen-containing gas is supplied equally from the oxygen-containing gas supply passage 36 to the respective electrolyte electrode assemblies 26 through the bridges 74 and the sandwiching sections 72. Thus, improvement and stability in the power generation performance can be achieved in each of the electrolyte electrode assemblies 26.

Further, the reactant gas supply section 76 is provided at the center of the separator 114, and the four electrolyte electrode assemblies 26 are arranged in a circle around the reactant gas supply section 76. In the structure, the fuel gas and the oxygen-containing gas to be supplied to the electrolyte electrode assemblies 26 are suitably heated by heat generated in power generation of the electrolyte electrode assemblies 26. Thus, it is possible to improve the heat efficiency and facilitate the thermally self-sustained operation of the fuel cells 110.

Further, the four electrolyte electrode assemblies 26 are arranged in a circle in a plane along the separator 114. Thus, in the fuel cell structure where two or more electrolyte electrode assemblies 26 having the same shape and area are arranged in a circle on the same surface of the separator 114, the high occupancy ratio of the electrolyte electrode assemblies 26 is achieved.

Further, the stack volume per unit power generation output is reduced, and the overall size of the fuel cell stack 112 is reduced easily. Further, the surface area of the stack per unit power generation output is reduced, and heat radiation from the fuel cell stack 112 is minimized. Thus, improvement in the heat efficiency is achieved, and thermally self-sustained operation is facilitated.

Further, the fuel cell stack 112 includes the first load applying unit 154 and the second load applying unit 158 of the load applying mechanism for applying the load to the fuel cells 110 in the stacking direction. The load applied to an area near the reactant gas supply section 76 (the load applied by the first load applying unit 154) is larger than the load applied to the electrolyte electrode assemblies 26 (load applied by the second load applying unit 158). The tightening load in the stacking direction is not transmitted between the reactant gas supply section 76 and the sandwiching section 72 through the bridge 74.

In the structure, it is possible to apply a relatively large load to the reactant gas supply section 76, and the desired sealing performance in the reactant gas supply section 76 is achieved. Further, a relatively small tightening load which is required to suitably tighten the electrolyte electrode assemblies 26 and the sandwiching sections 72 together is applied to the electrolyte electrode assemblies 26 to prevent damage or the like of the electrolyte electrode assemblies 26. Accordingly, improvement in the current collection performance is achieved advantageously.

Figure 11:
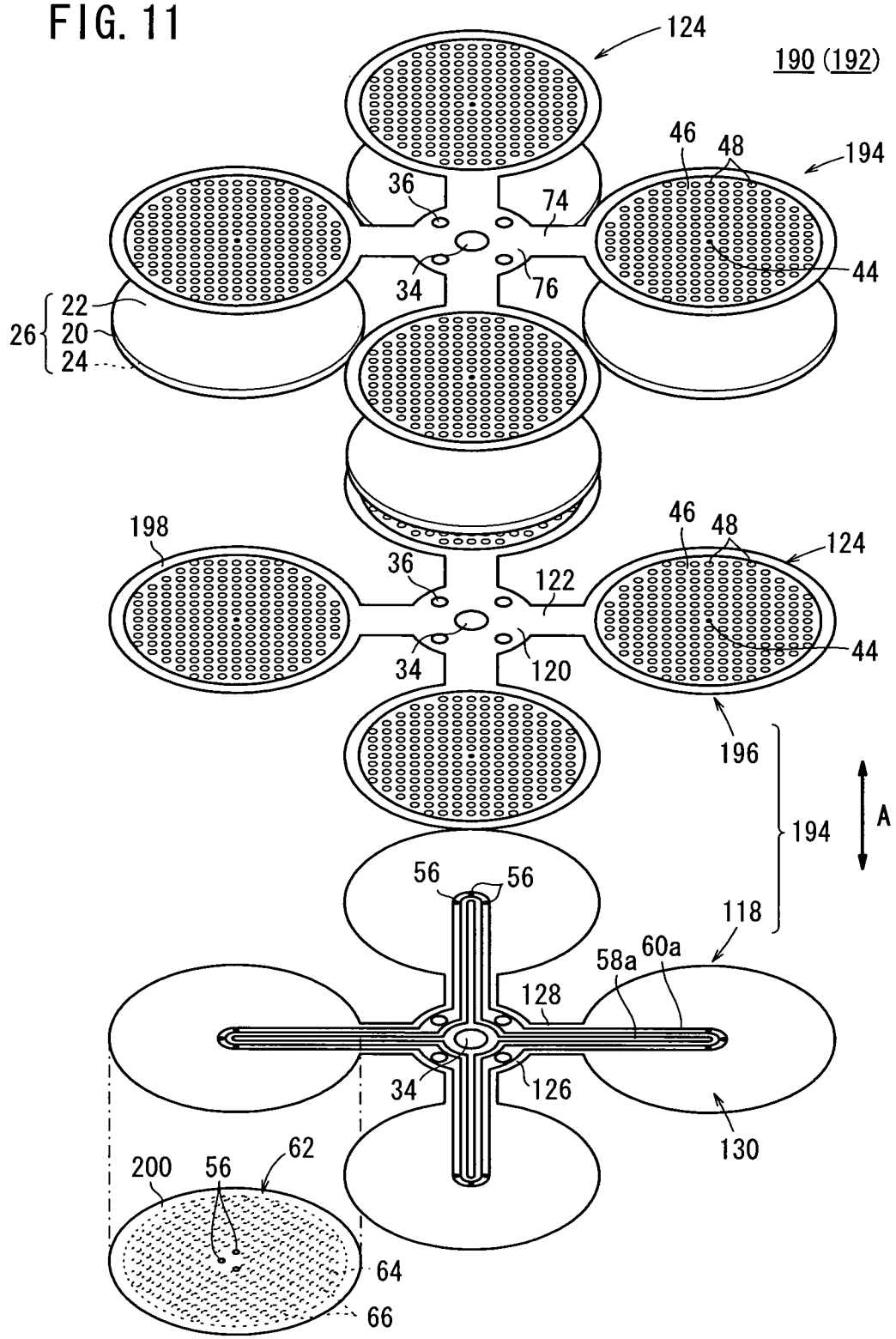
FIG. 11 is an exploded perspective view showing a fuel cell according to a fourth embodiment of the present invention.

FIG. 11 is an exploded perspective view showing a fuel cell 190 according to a fourth embodiment of the present invention. A plurality of fuel cells 190 are stacked together in the direction indicated by the arrow A to form a fuel cell stack 192.

The fuel cell 190 includes a separator 194, and the separator 194 has a first plate 196 and a second plate 118. A circumferential protrusion 198 is provided in a first sandwiching section 124 of the first plate 196. The circumferential protrusion 198 protrudes on the side of the fuel gas channel 46, and the circumferential protrusion 198 contacts the outer the circumferential edge of the anode 24. For example, the circumferential protrusion 198 is formed by, e.g., etching, like the protrusions 48.

In the fourth embodiment, the circumferential protrusion 198 is provided in the first sandwiching section 124, along the circumferential edge around the fuel gas channel 46. In the structure, the exhaust gas or the oxygen-containing gas does not enter the anode 24 from the outside of the electrolyte electrode assembly 26, and degradation in the power generation performance due to oxidation of the anode 24 is prevented. Improvement in the durability of the separator 194 and the electrolyte electrode assembly 26 is achieved advantageously.

Further, a circumferential protrusion 200 may be provided along the outer circumferential edge of the plate 62 such that the circumferential protrusion 200 protrudes on the side of the oxygen-containing gas channel 64 to contact the outer circumferential region of the cathode 22. In the structure, the exhaust gas or the fuel gas does not enter the cathode 22 from the outside of the electrolyte electrode assembly 26, and degradation in the power generation performance due to reduction of the cathode 22 is prevented. Improvement in the durability of the electrolyte electrode assembly 26 is achieved advantageously.

Figure 12:
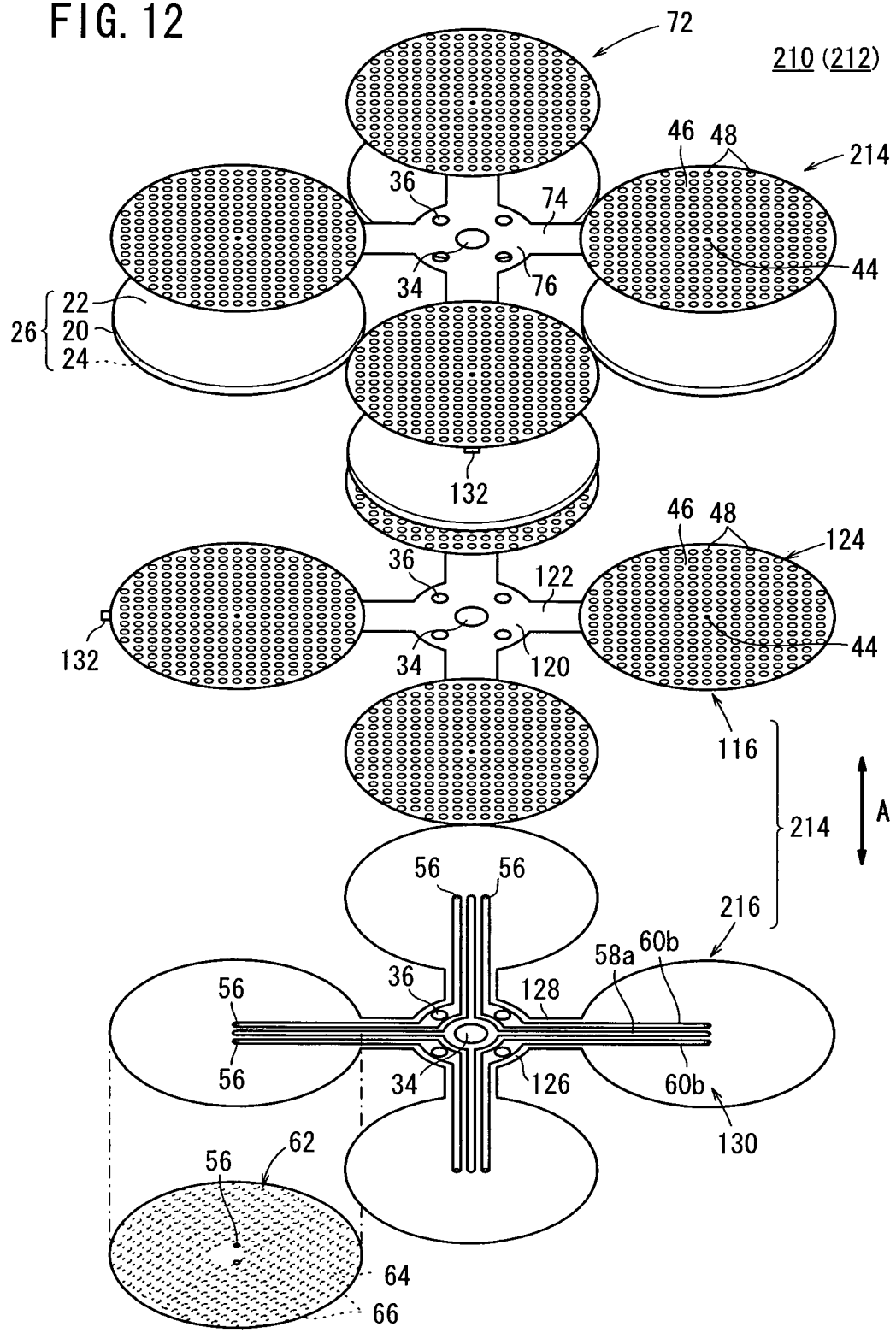
FIG. 12 is an exploded perspective showing a fuel cell according to a fifth embodiment of the present invention.

FIG. 12 is an exploded perspective view showing a fuel cell 210 according to a fifth embodiment of the present invention. A plurality of the fuel cells 210 are stacked together in the direction indicated by an arrow A to form the fuel cell stack 212.

The fuel cell 210 includes a separator 214 having a first plate 116 and a second plate 216. In each of second bridges 128 of the second plate 216, two oxygen-containing gas supply channels 60b are provided on both sides of each fuel gas supply channel 58. The oxygen-containing gas supply channels 60b terminate at substantially the central positions of the respective sandwiching sections 72, and are connected to oxygen-containing gas inlets 56, respectively.

In the fifth embodiment, the same advantages as in the case of the third embodiment are obtained.

Figure 13:
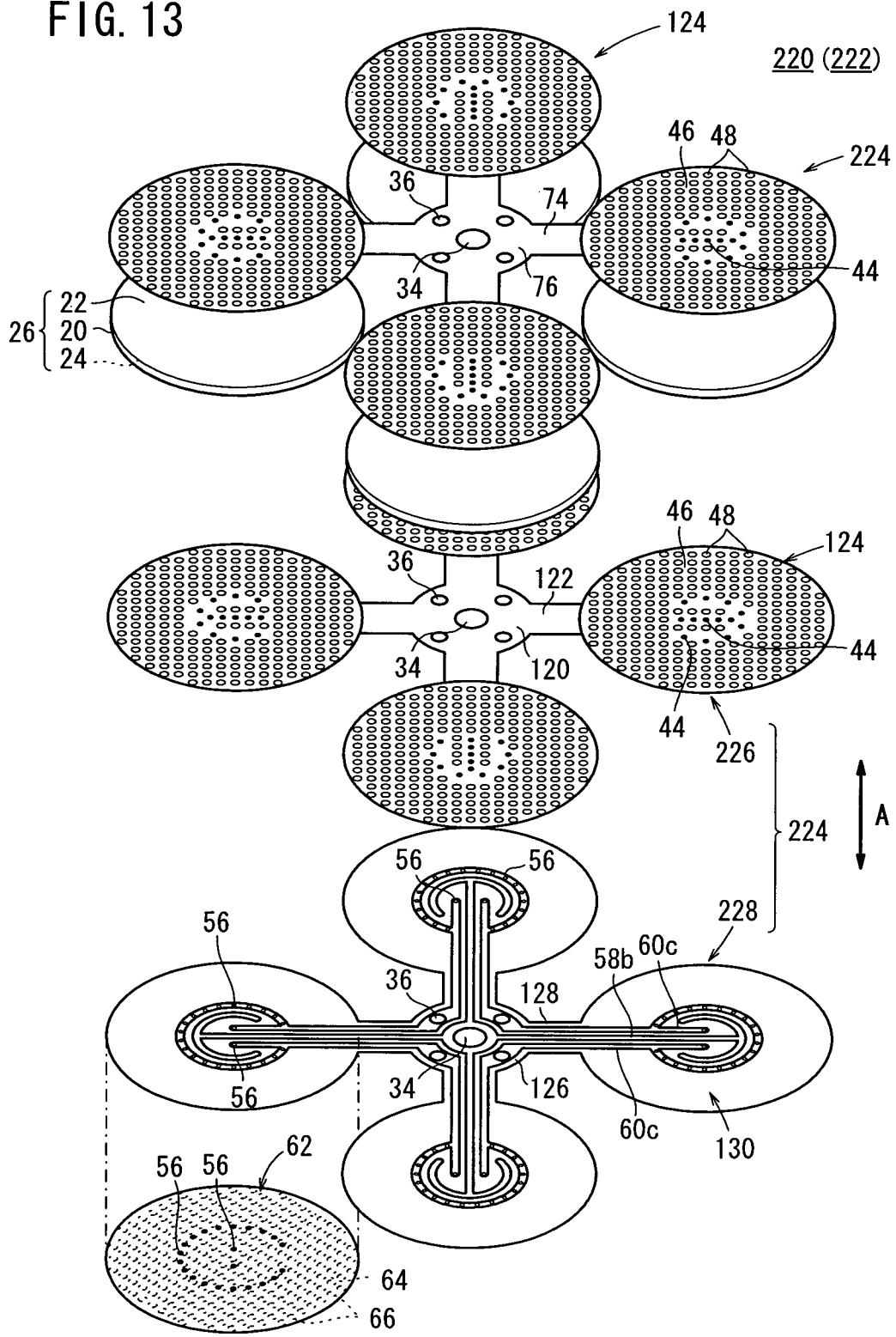
FIG. 13 is an exploded perspective view showing a fuel cell according to a sixth embodiment of the present invention.

FIG. 13 is an exploded perspective view showing a fuel cell 220 according to a sixth embodiment of the present invention. A plurality of fuel cells 220 are stacked together in a direction indicated by an arrow A to form a fuel cell stack 222.

The fuel cell 220 includes a separator 224 having a first plate 226 and a second plate 228. A plurality of fuel gas inlets 44 are formed in a first sandwiching section 124 of the first plate 226.

The second plate 228 has a fuel gas supply channel 58b extending from a fuel gas supply passage 34 to a second sandwiching section 130, and oxygen-containing gas supply channels 60c extending from oxygen-containing gas supply passages 36 to the second sandwiching section 130. The fuel gas supply channel 58b includes a straight portion extending from the fuel gas supply passage 34 to substantially the central position of the second sandwiching section 130, and a circular arc portion extending from the end of the straight portion. The fuel gas inlets 44 in the first sandwiching section 124 are provided along the shape of the fuel gas supply channel 58b.

The oxygen-containing gas supply channels 60c include a pair of straight portions provided on both side of the fuel gas fuel gas supply channel 58b, and extending from the oxygen-containing gas supply passages 36 to the second sandwiching section 130. Further, the oxygen-containing gas supply channels 60c include circular arc portions provided around the circular arc portion of the fuel gas supply channel 58b. In the second sandwiching section 130 and the plate 62, a plurality of oxygen-containing gas inlets 56 are formed along the shape of the oxygen-containing gas supply channel 60c.

In the sixth embodiment, after the fuel gas is supplied from the fuel gas supply passage 34 to the fuel gas supply channel 58b, the fuel gas flows along the fuel gas supply channel 58b toward the first sandwiching section 124.

The fuel gas flows from the fuel gas supply channel 58b to the fuel gas inlets 44 formed in the first sandwiching section 124, and the fuel gas is supplied to the anode 24 like a shower. The air flows into the oxygen-containing gas supply passages 36 to the oxygen-containing gas supply channels 60c, and the air is supplied from the oxygen-containing gas inlets 56 formed in the second sandwiching section 130 and the plate 62 to the cathode 22 like a shower.

As described above, in the sixth embodiment, the number of the fuel gas inlets 44 is determined depending on the area of the electrolyte electrode assembly 26. Therefore, the uniform fuel gas concentration is achieved in the electrolyte electrode assembly 26, and fuel depletion is suppressed. In this manner, non-uniform current density distribution in the electrolyte electrode assembly 26 is prevented, and improvement and stability in the power generation efficiency are achieved.

Likewise, the number of the oxygen-containing gas inlets 56 is determined depending on the area of the electrolyte electrode assembly 26. Therefore, the uniform oxygen-containing gas concentration is achieved in the electrolyte electrode assembly 26, and air depletion is suppressed. In this manner, non-uniform current density distribution in the electrolyte electrode assembly 26 is prevented, and improvement and stability in the power generation efficiency are achieved.

Further, the fuel gas and the oxygen-containing gas are supplied to the electrode surface of the electrolyte electrode assembly 26 like a shower, and heat generation reaction and power generation reaction are carried out uniformly in the electrolyte electrode assembly 26. Generation of temperature gradient in the electrolyte electrode assembly 26 is suppressed, and power generation failure of the electrolyte electrode assembly 26 due to heat stress is suppressed.

Figure 14:
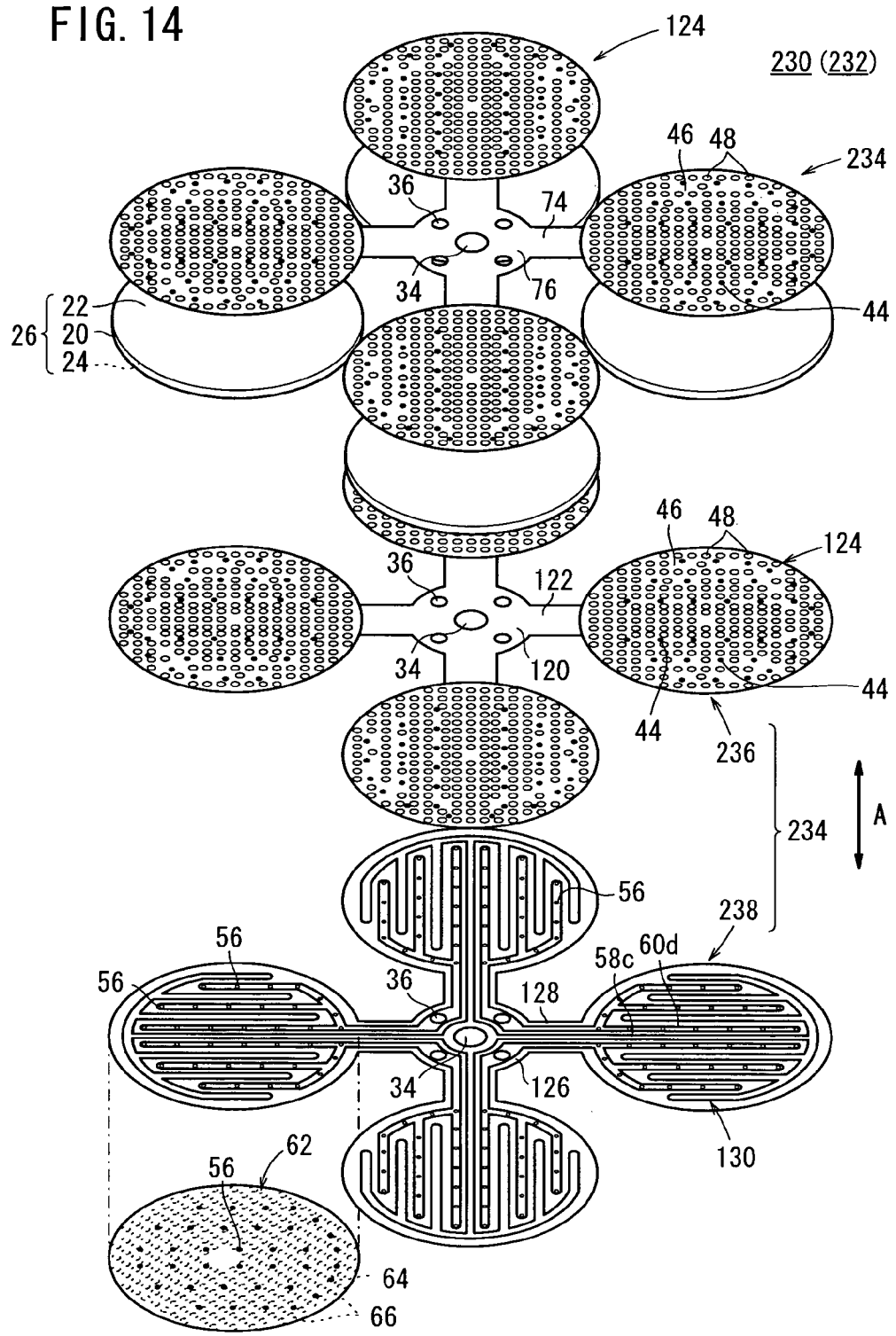
FIG. 14 is an exploded perspective view showing a fuel cell according to a seventh embodiment of the present invention.

FIG. 14 is an exploded perspective view showing a fuel cell 230 according to a seventh embodiment of the present invention. A plurality of the fuel cells 230 are stacked together in a direction indicated by an arrow A to form a fuel cell stack 232.

The fuel cell 230 includes a separator 234 having a first plate 236 and a second plate 238. A plurality of fuel gas inlets 44 are formed in the first sandwiching section 124. The second plate 238 has a fuel gas supply channel 58c and oxygen-containing gas supply channels 60d.

The fuel gas supply channel 58c includes a straight portion extending from the fuel gas supply passage 34 to the second sandwiching section 130, and a comb-like portion extending from the straight portion. The fuel gas inlets 44 are provided along the shape of the fuel gas supply channel 58c. The oxygen-containing gas supply channels 60d include a pair of straight portions provided on both sides of the fuel gas supply channel 58c, and a comb-like portion extending from the straight portions. A plurality of oxygen-containing gas inlets 56 are formed along the shape of the oxygen-containing gas supply channel 60d.

In the seventh embodiment, the fuel gas and the oxygen-containing gas are supplied to the electrolyte electrode assembly 26 like a shower. Therefore, the same advantages as in the case of the sixth embodiment are obtained.

Figure 15:
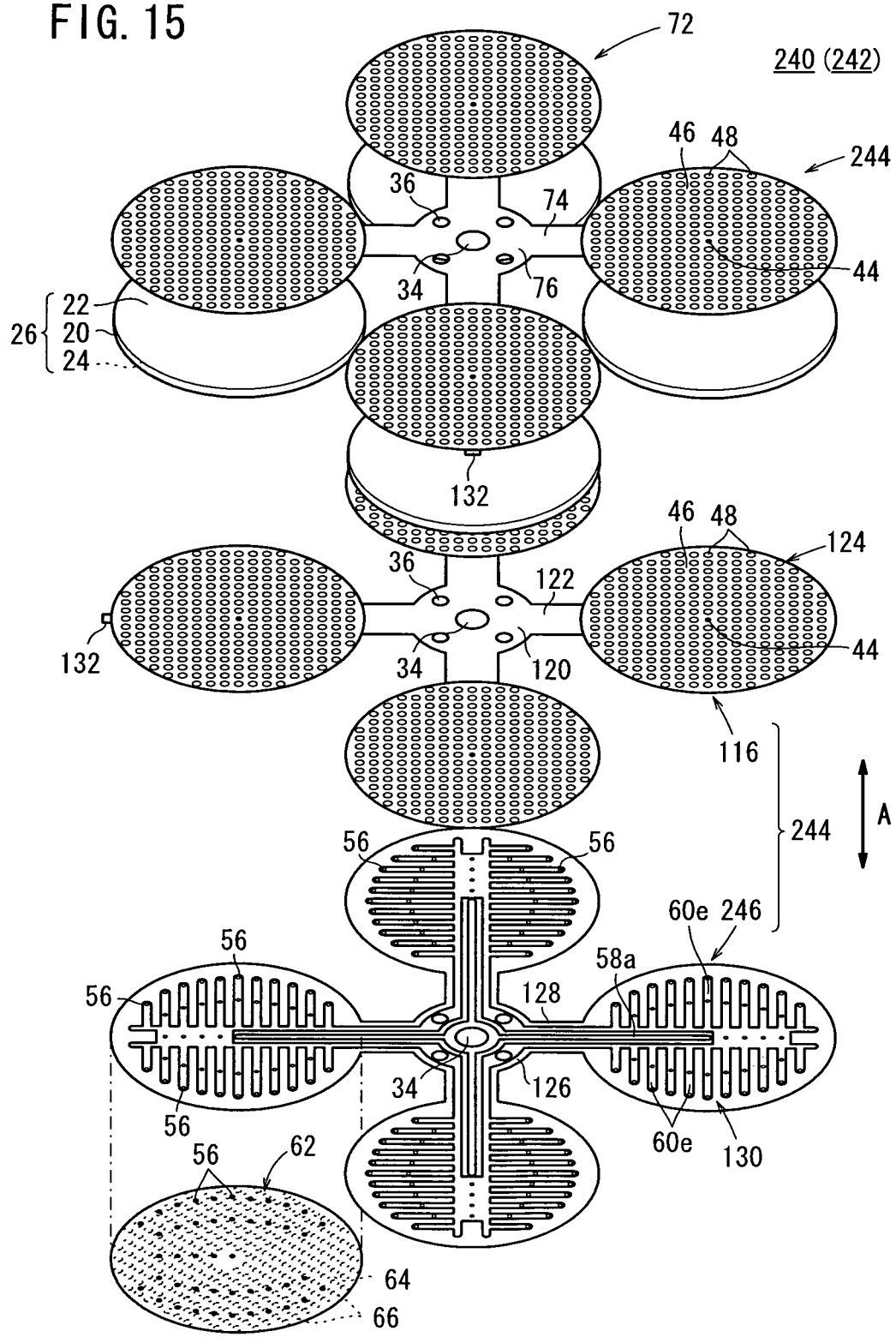
FIG. 15 is an exploded perspective view showing a fuel cell according to an eighth embodiment of the present invention.

FIG. 15 is an exploded perspective view showing a fuel cell 240 according to an eighth embodiment of the present invention. A plurality of fuel cells 240 are stacked together in a direction indicted by an arrow A to form a fuel cell stack 242.

The fuel cell 240 includes a separator 244 having a first plate 116 and a second plate 246. The second plate 246 has a fuel gas supply channel 58a and oxygen-containing gas supply channels 60e.

A pair of the oxygen-containing gas supply channels 60e are provided on both sides of each fuel gas supply channel 58a, and the oxygen-containing gas supply channels 60e include straight portions extending from the oxygen-containing gas supply passages 36 and a plurality of straight portions extending from the straight portions in a direction perpendicular to the straight portions on the surface of the second sandwiching section 130. A plurality of oxygen-containing gas inlets 56 are formed along the shape of the oxygen-containing gas supply channels 60e in the second sandwiching section 130 and the plate 62.

In the eight embodiments, the same advantages as in the cases of the sixth and seventh embodiments are obtained.

Figure 16:
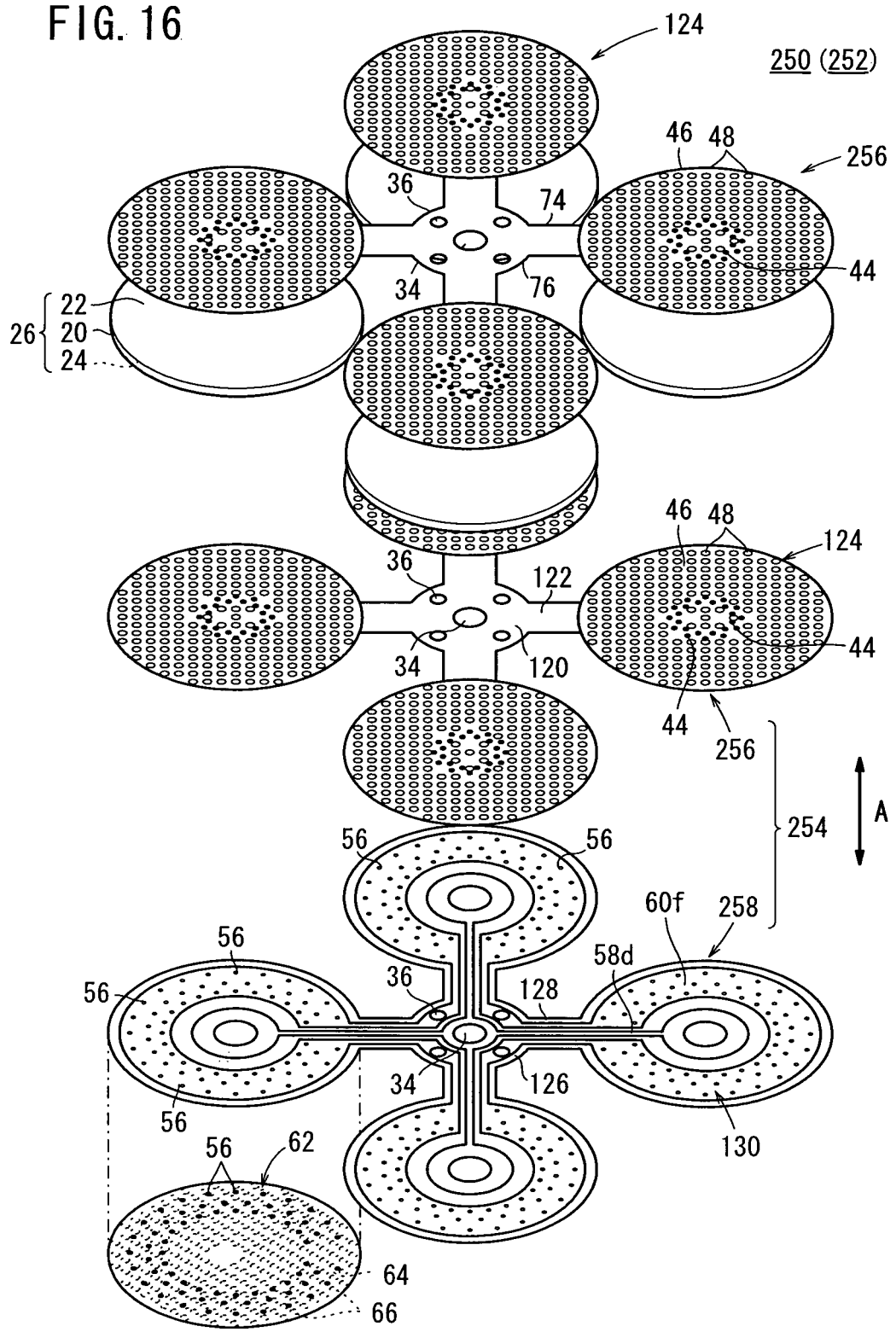
FIG. 16 is an exploded perspective view showing a fuel cell according to a ninth embodiment of the present invention.
Figure 17:
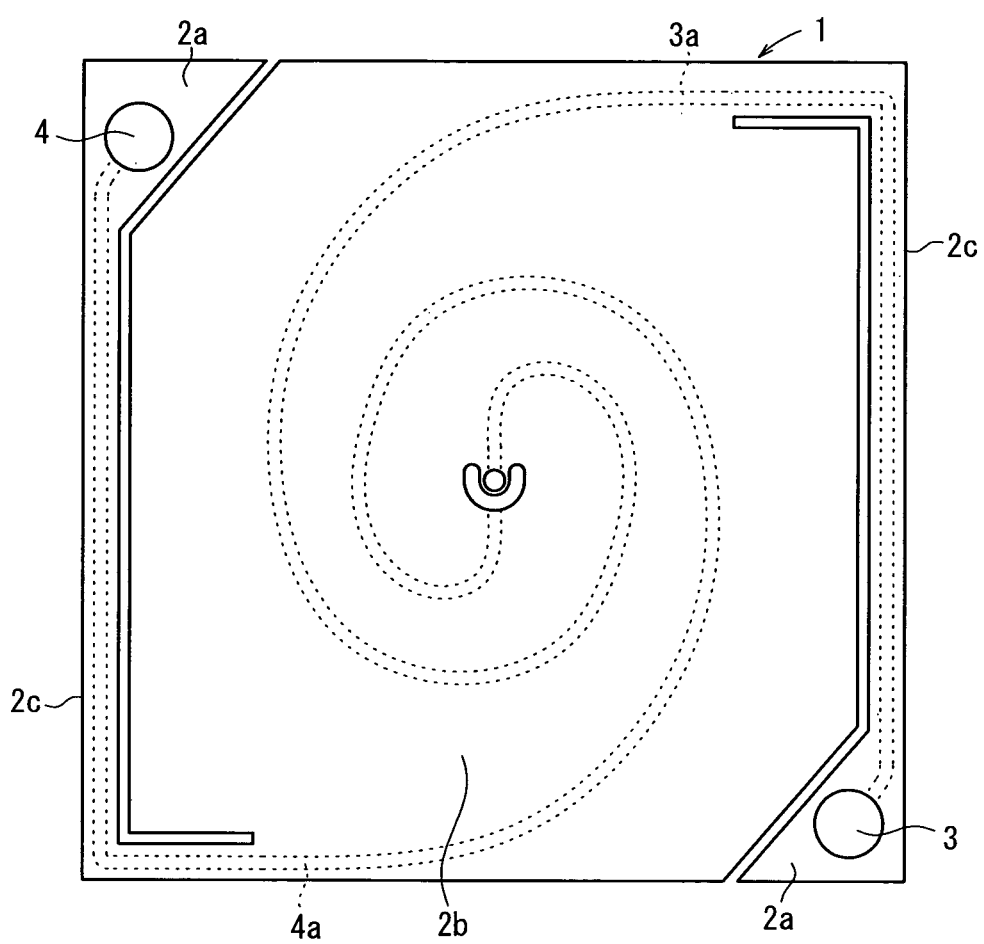
FIG. 17 is a view showing a separator of a conventional fuel cell.

FIG. 16 is an exploded perspective view showing a fuel cell 250 according to a ninth embodiment of the present invention. A plurality of the fuel cells 250 are stacked together in the direction indicated by an arrow A to form a fuel cell stack 252.

The fuel cell 250 includes a separator 254 having a first plate 256 and a second plate 258. A plurality of fuel gas inlets 44 are formed in the first sandwiching section 124 of the first plate 256. A fuel gas supply channel 58d and the oxygen-containing gas supply channel 60f are formed in the second plate 258.

The fuel gas supply channel 58d includes a straight portion extending from the fuel gas supply passage 34 to the second sandwiching section 130, and a ring shaped portion connected to an end of the straight portion. The fuel gas inlets 44 are formed in an area corresponding to the ring shaped portion. The oxygen-containing gas supply channel 60f are provided on both sides of the fuel gas supply channel 58d, and includes a straight portion and a ring shaped portion provided concentrically with the second sandwiching section 130. A plurality of oxygen-containing gas inlets 56 are formed in the ring shaped portion, and a plurality of oxygen-containing gas inlets 56 are also formed in the plate 62.

In the ninth embodiment as described above, the fuel gas and the oxygen-containing gas are supplied to the electrolyte electrode assemblies 26 like a shower. Therefore, the same advantages as in the cases of the sixth to seventh embodiments are obtained.

Although certain preferred embodiments of the present invention have been shown and described in detail, it should be understood that various changes and modifications may be made therein without departing from the scope of the appended claims.

The invention claimed is:

1. A fuel cell formed by stacking an electrolyte electrode assembly between separators in a stacking direction, the electrolyte electrode assembly including an anode, a cathode, and an electrolyte interposed between the anode and the cathode, each of the separators comprising:
   a sandwiching section for sandwiching the electrolyte electrode assembly, the sandwiching section having a fuel gas channel for supplying a fuel gas and an oxygen-containing gas channel for supplying an oxygen-containing gas, separately;
   a bridge connected to the sandwiching section, the bridge having a fuel gas supply channel for supplying the fuel gas to the fuel gas channel and an oxygen-containing gas supply channel for supplying the oxygen-containing gas to the oxygen-containing gas channel; and
   a reactant gas supply section connected to the bridge, a fuel gas supply passage for supplying the fuel gas to the fuel gas supply channel and an oxygen-containing gas supply passage for supplying the oxygen-containing gas to the oxygen-containing gas supply channel extending through the reactant gas supply section in the stacking direction, wherein
   the fuel gas supplied from the fuel gas supply passage of one of the separators to the fuel gas channel of the sandwiching section of one of the separators through the fuel gas supply channel of the bridge of one of the separators is supplied along an electrode surface of the anode, and the oxygen-containing gas supplied from the oxygen-containing gas supply passage of another of the separators to the oxygen-containing gas channel of the sandwiching section of the another of the separators through the oxygen-containing gas supply channel of the bridge of the another of the separators is supplied along an electrode surface of the cathode.

2. A fuel cell according to claim 1, wherein the reactant gas supply section is provided at the center of the separators, and a plurality of the electrolyte electrode assemblies are arranged in a circle around the reactant gas supply section.

3. A fuel cell according to claim 2, wherein a plurality of the sandwiching sections each having a circular disk shape in correspondence with each of the electrolyte electrode assemblies are provided, and the sandwiching sections are separated from each other.

4. A fuel cell according to claim 1, wherein the sandwiching section has at least one fuel gas inlet connecting the fuel gas channel to the fuel gas supply channel.

5. A fuel cell according to claim 1, wherein a plurality of projections are provided on the sandwiching section, and the projections protrude on a side of the fuel gas channel to contact the anode.

6. A fuel cell according to claim 1, wherein a circumferential protrusion is provided on an outer edge of the sandwiching section where the fuel gas channel is provided, and the circumferential protrusion protrudes on a side of the fuel gas channel to contact an outer edge of the anode.

7. A fuel cell according to claim 1, wherein the sandwiching section has at least one oxygen-containing gas inlet connecting the oxygen-containing gas channel to the oxygen-containing gas supply channel.

8. A fuel cell according to claim 1, wherein a plurality of projections are provided on the sandwiching section, and the projections protrude on a side of the oxygen-containing gas channel to contact the cathode.

9. A fuel cell according to claim 1, wherein a circumferential protrusion is provided on an outer edge of the sandwiching section where the oxygen-containing gas channel is provided, and the circumferential protrusion protrudes on a side of the oxygen-containing gas channel to contact an outer edge of the cathode.

10. A fuel cell according to claim 1, wherein electrically conductive nonwoven fabric or electrically conductive woven fabric is provided on the sandwiching section where the oxygen-containing gas channel is provided, and the electrically conductive nonwoven fabric or the electrically conductive woven fabric contacts the cathode.

11. A fuel cell according to claim 1, wherein at least one sandwiching section has an extension for collecting electrical energy generated in the electrolyte electrode assembly.

12. A fuel cell according to claim 1, wherein a plurality of the bridges are provided, and the bridges extend radially outwardly from the reactant gas supply section, and are spaced from each other at equal angular intervals.

13. A fuel cell according to claim 1, wherein a plurality of the oxygen-containing gas supply channels and the fuel gas supply channel interposed between the oxygen-containing gas supply channels are provided in the bridge.

14. A fuel cell according to claim 1, wherein the numbers of the sandwiching sections and the bridges of the separators correspond to the number of the electrolyte electrode assemblies.

15. A fuel cell according to claim 1, wherein the fuel gas supply passage is provided at the center of the reactant gas supply section, and a plurality of the oxygen-containing gas supply passages are arranged in a circle around the fuel gas supply passage.

16. A fuel cell according to claim 1, wherein a plurality of the bridges are provided, and the oxygen-containing gas supply passage extends through a position corresponding to a space between the bridges.

17. A fuel cell according to claim 1, wherein the number of the oxygen-containing gas supply passages extending through the separators corresponds to the number of the electrolyte electrode assemblies.

18. A fuel cell according to claim 1, wherein the reactant gas supply section is provided at the center of the separators, and four electrolyte electrode assemblies are arranged in a circle around the reactant gas supply section.

19. A fuel cell according to claim 1, wherein the fuel cell is a solid oxide fuel cell.

20. A fuel cell stack formed by stacking a plurality of fuel cells in a stacking direction, the fuel cells each formed by stacking an electrolyte electrode assembly between separators in a stacking direction, the electrolyte electrode assembly including an anode, a cathode, and an electrolyte interposed between the anode and the cathode, each of the separators comprising:
   a sandwiching section for sandwiching the electrolyte electrode assembly, the sandwiching sections having a fuel gas channel for supplying a fuel gas and an oxygen-containing gas channel for supplying an oxygen-containing gas, separately;
   a bridge connected to the sandwiching section, the bridge having a fuel gas supply channel for supplying the fuel gas to the fuel gas channel and an oxygen-containing gas supply channel for supplying the oxygen-containing gas to the oxygen-containing gas channel; and
   a reactant gas supply section connected to the bridge, a fuel gas supply passage for supplying the fuel gas to the fuel gas supply channel and an oxygen-containing gas supply passage for supplying the oxygen-containing gas to the oxygen-containing gas supply channel extending through the reactant gas supply sections in the stacking direction, wherein
   the fuel gas supplied from the fuel gas supply passage of one of the separators to the fuel gas channel of the sandwiching section of one of the separators through the fuel gas supply channel of the bridge of the one of the separators is supplied along an electrode surface of the anode, and the oxygen-containing gas supplied from the oxygen-containing gas supply passage of another of the separators to the oxygen-containing gas channel of the sandwiching section of the another of the separators through the oxygen-containing gas supply channel of the bridge of the another of the separators is supplied along an electrode surface of the cathode.

21. A fuel cell stack according to claim 20, further comprising a load applying mechanism for applying a load to the fuel cells in the stacking direction, wherein a load applied to an area near the reactant gas supply section by the load applying mechanism in the stacking direction is larger than a load applied to the electrolyte electrode assembly by the load applying mechanism in the stacking direction.

22. A fuel cell stack according to claim 20, wherein the fuel cells are solid oxide fuel cells.

* * * * *